United States Patent
Vadapandeshwara et al.

(10) Patent No.: US 10,969,929 B2
(45) Date of Patent: Apr. 6, 2021

(54) DEPENDENCY GRAPH-CONTROLLED OBJECT AND COMPUTE PIPELINE MIGRATION

(71) Applicant: ORACLE FINANCIAL SERVICES SOFTWARE LIMITED, Mumbai (IN)

(72) Inventors: Rajaram N. Vadapandeshwara, Bangalore (IN); Jesna Jacob, Bangalore (IN); Rony Joshy, Kottayam (IN)

(73) Assignee: Oracle Financial Services Software Limited, Mumbai (IN)

(*) Notice: Subject to any disclaimer, the term of this patent is extended or adjusted under 35 U.S.C. 154(b) by 0 days.

(21) Appl. No.: 16/430,566

(22) Filed: Jun. 4, 2019

(65) Prior Publication Data

US 2020/0125238 A1 Apr. 23, 2020

(51) Int. Cl.
*G06F 3/048* (2013.01)
*G06F 3/0481* (2013.01)
(Continued)

(52) U.S. Cl.
CPC .......... *G06F 3/04817* (2013.01); *G06F 9/451* (2018.02); *G06F 16/9024* (2019.01)

(58) Field of Classification Search
None
See application file for complete search history.

(56) References Cited

U.S. PATENT DOCUMENTS

2011/0213883 A1* 9/2011 Athey .................... G06Q 10/06
709/226

2014/0012969 A1* 1/2014 Brandwine .......... H04L 41/145
709/223
(Continued)

FOREIGN PATENT DOCUMENTS

EP 1065618 A2 * 1/2001 ............. G06Q 10/10

OTHER PUBLICATIONS

Patent Cooperation Treaty (PCT), International Search Report and Written Opinion of the International Searching Authority, issued in PCT International Application No. PCT/IN2019/050773, having an International Filing Date of Oct. 19, 2019, dated Jan. 31, 2020 (9 pgs).

(Continued)

*Primary Examiner* — William C Trapanese
(74) *Attorney, Agent, or Firm* — Kraguljac Law Group, LLC

(57) ABSTRACT

Control migration of a state machine using a dependency graph interface by: analyzing a state machine to determine objects and dependencies between the objects; generating a dependency graph that represents the objects and the dependencies between the objects, wherein the objects are represented by selectable icons; displaying the dependency graph on a display device; in response to a selection of a particular selectable icon, providing a migration option for an object represented by the selectable icon, wherein the migration option includes at least a selection between either a deep copy or a shallow copy for the object represented by the selectable icon; accepting and storing a selection of the migration option for the object represented by the particular selectable icon; and migrating the state machine to a target environment based at least in part on performing the migration option for the object represented by the particular selectable icon.

20 Claims, 13 Drawing Sheets

(51) Int. Cl.
*G06F 16/901* (2019.01)
*G06F 9/451* (2018.01)

(56) References Cited

U.S. PATENT DOCUMENTS

2015/0161151 A1* 6/2015 Koryakina .......... G06F 9/45558
                                                          711/114
2017/0228388 A1    8/2017 Venkat et al.
2019/0205479 A1*  7/2019 Zizka .................... G06F 9/4856

OTHER PUBLICATIONS

Intelligent Converters; Direct Export from Oracle Dump Files, 1 pg., copyright 2001-2018; downloaded on May 22, 2019 from: https://www.convert-in.com/oracle-dump.htm.

Oracle Financial Services Software, Ltd.; Oracle Financial Services Analytical Applications Infrastructure, Object Migration Utility—OFSAAI v7.3.5.1.0/7.3.5.2.0 to v8.x—User Guaide—Part No.—E60058-01; copyright 2015; pp. 1-29.

* cited by examiner

Objects — 670

| Object Name | Folder — 645 | Include Dependency — 650 | — 655 | Additional Parameters — 660 |
|---|---|---|---|---|
| ▼ ⊗ Break Identification Process — 640 | | | | |
| ⊗ T2T Break Detection Process | IFRSSEG01 | ☑ | ⊹ | ⬛ |
| ▼ ⊗ Data Quality Rule | | | | |
| ⊗ DQASSET0001 | FSDFSEG | ☑ | ⊹ | ⬛ |
| ⊗ DQASSET0002 | FSDFSEG | ☐ | ⊹ | ⬛ |
| ⊗ DQASSET0003 | FSDFSEG | ☑ | ⊹ | ⬛ |
| ▼ ⊗ Aliases | | | | |
| ALL OBJECTS(*) | | ☐ | ⊹ | ⬛ |

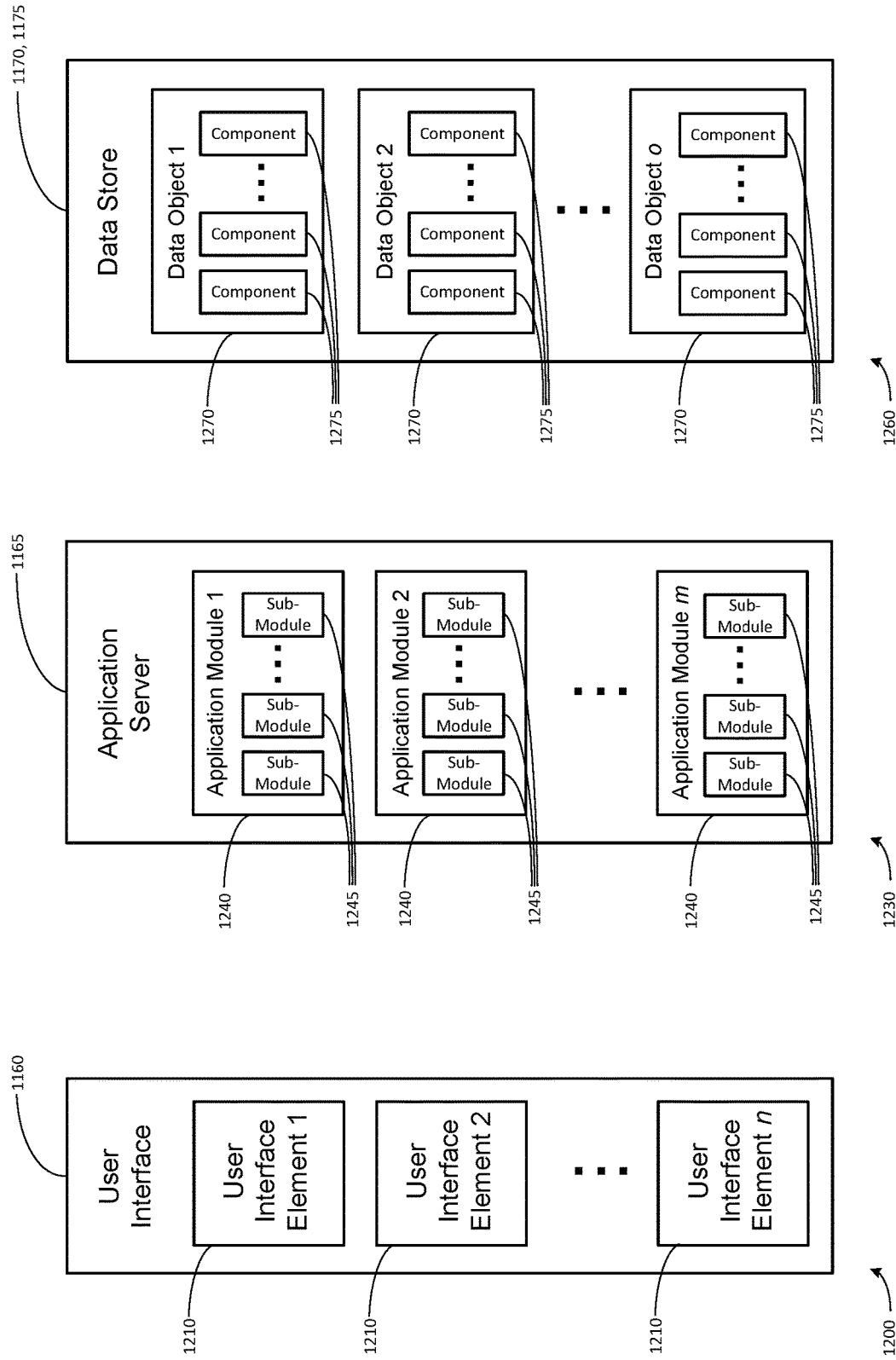

DEPENDENCY GRAPH-CONTROLLED OBJECT AND COMPUTE PIPELINE MIGRATION

RELATED APPLICATION

This application claims the benefit of INDIAN Provisional Application No. 201841039626, filed Oct. 19, 2018, which is incorporated herein by reference in its entirety.

BACKGROUND

Analytic systems have a complex network of objects that define the "state" of the system. The objects may be interconnected in particular orders and given particular configurations to form compute pipelines. These compute pipelines allow the system to deliver practical functional outcomes from data inputs.

From time to time, it may be desirable to export a compute pipeline or objects from a source computing system and import the same objects into a target computing system. But, the objects in a given compute pipeline may have dependencies from other objects in the analytic system that are not necessarily part of the compute pipeline. The potential number of objects and dependencies that represent the full state of the compute pipeline can be very high. The dependencies among these objects (and with other objects of the analytic system) are not necessarily evident and are intertwined in complex ways. These objects and dependencies are not readily tracked by humans.

Despite the complex intertwining of dependencies, existing tools do not allow a user to select a desired granularity of objects or higher order compute pipeline while the tool automatically handles the dependencies associated with the objects or pipelines. Existing tools also lack visual audit and generated documentation to validate migration of objects.

Thus, capturing a complete snapshot of the state-machine for the compute pipeline and replicating it in another environment presents many challenges. At present, migrating select pipelines is a heavily manual process. Current tools for transfer are black-box solutions that generate an archive image that can be restored through an import process of the archive dump. Following import of the archive dump, there is often extensive human intervention in the restored image, testing every object for validity and testing end-to-end executions of the migrated pipelines. Multiple review and approval processes must be followed to reduce risk of errors.

Today, much of the migration is from a local source environment maintained by a business enterprise to a cloud target environment maintained by the business enterprise or by a third party. The shift to the cloud deployment of the pipeline comes with an expectation of a high degree of automation, and is constrained by limited human access to backend systems and object repository. Coupled with the fact that migration of a compute pipeline that encompasses complex domain functionality with its many objects and dependencies requires extensive testing and validation before the target environment can be up and running for production use, the traditional model of manual pipeline migration does not work for cloud migrations.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 6 illustrates one embodiment of a graphical user interface suitable for presentation on a display device and associated with showing a summary view of dependencies for objects that make up a state machine.

FIG. 12A illustrates additional details of the elements or components of a user interface.

FIG. 12B illustrates additional details of the elements or components of an application server.

FIG. 12C illustrates additional details of the elements or components of a data store.

DETAILED DESCRIPTION

Computer-implemented systems and methods for dependency graph-controlled object and computer pipeline migration are described herein. In one embodiment, a system and method is disclosed that provides features for a migration system that implements and generates dependency graphs of objects to assist the migration process to be more accurate and efficient.

Figure 1:
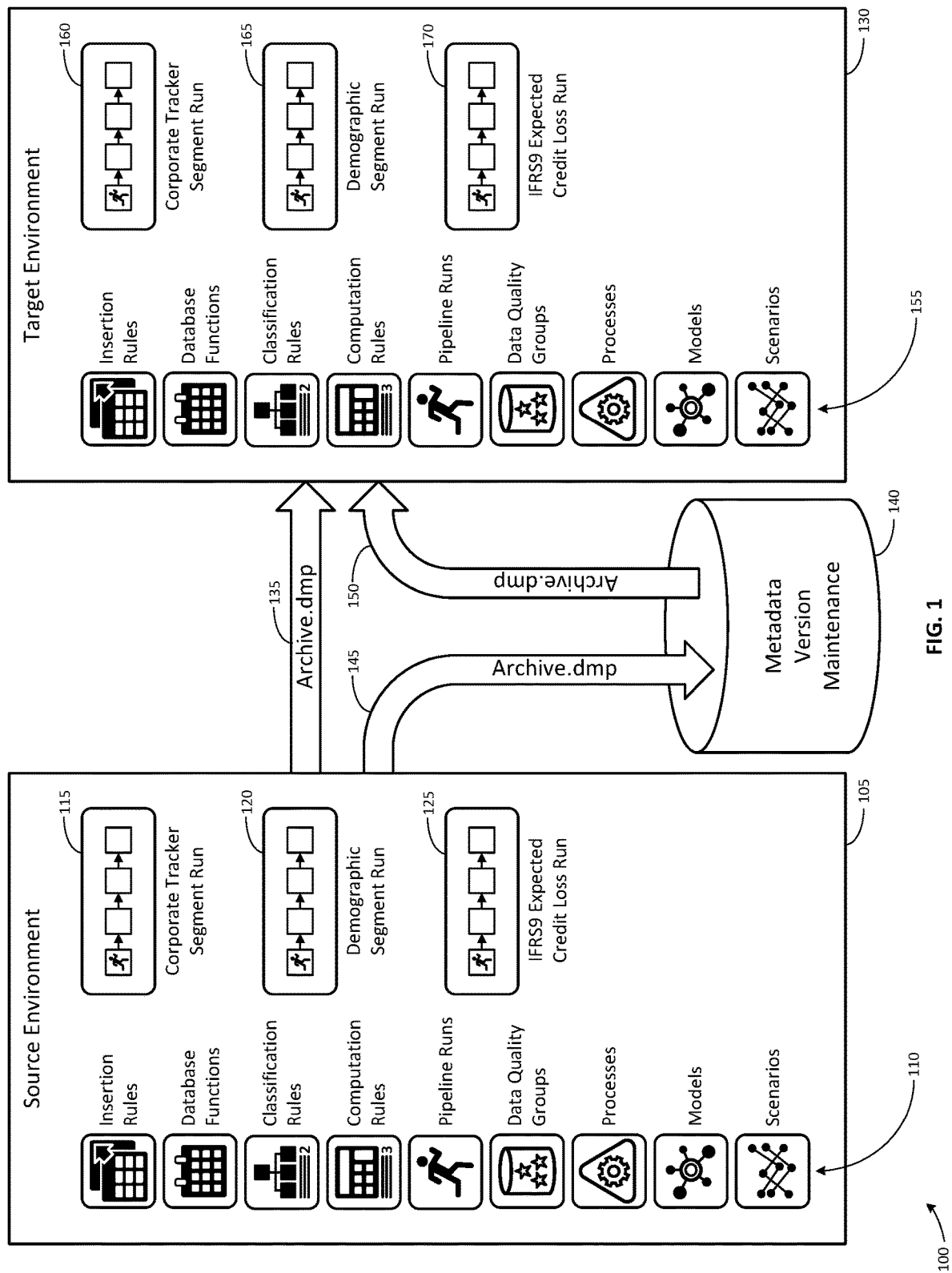
FIG. 1 illustrates one embodiment of an application state machine migration.

Referring now to FIG. 1, one embodiment of an application state machine migration 100 is illustrated. An example source environment 105 including an analytic system made up of a variety of object types 110 and several compute pipelines 115, 120, 125 is shown. The source environment may be hosted, for example, on local (such as on-premise) server computers of an enterprise network, or on the servers of a cloud computing system, such as a multi-tenant distributed computing platform.

Corporate Tracker Segment Run 115, Demographic Segment Run 120, and IFRS9 Expected Credit Loss run 125 are example compute pipelines of the analytic system.

In this example, the various object types 110 include insertion rules, database functions, classification rules, computation rules, pipeline runs, data quality groups, processes, models, and scenarios. Other computing objects useful for configuring higher-order entities such as compute pipelines, end-to-end process pipelines, or an application-run may also be included in the object types.

In one embodiment, individual objects of the various types 110 and higher-order entities such as the example compute pipelines 115, 120, and 125 may be tagged (using the tag identifier included in the individual objects) for inclusion in an archive file for export from the source environment. In one example, the archive file may be created using an Oracle® EXP (export) tool and saved with a binary dump ".dmp" file extension. In one example, the archive dump file represents a snapshot of the states (or configurations) of the objects that were tagged for inclusion as of the time that the archive dump file was created.

In one embodiment, the archive dump file may be exported directly to import into a target environment 130, as shown at reference 135. In another embodiment, the archive dump file may be exported and stored in a metadata version maintenance database 140 associated with a business enterprise, as shown at reference 145. The archive dump file may later be retrieved from the metadata version maintenance database 140 for import into the target environment 130, as shown at reference 150. In one example, where the archive file is a binary dump created using the Oracle® EXP tool, the archive file may be imported into the target environment 130 using an Oracle® IMP (import) tool.

In one embodiment, after import into the target environment 130, replicas 155 of one or more of the object types 110 and replicas 160, 165, and 170 of one or more of the example compute pipelines 115, 120, and 125 are added to the target environment. Here, this migration may include the state of each object that makes up the compute pipelines 115, 120, and 125 in the creation of the replica compute pipelines 160, 165, and 170. This example migration shows all object types 110 and example compute pipelines 115, 120, 125 being replicated in target environment 130, but, based on tagging of the objects, less than all objects need to be included in the migration (down even to the grain of individual objects). For example, only the Corporate Tracker Segment Run pipeline 115 might be included for replication in the target environment 130 as replicated Corporate Tracker Segment Run pipeline 160.

In one embodiment, Directed Acyclic Graphs (DAG) are generated to drive and assist with migration of objects and compute pipelines. The directed acyclic graphs may be displayed with a display device to provide a graphical display of object dependencies for the objects and compute pipelines that may be present in the source environment and/or in the target environment. The directed acyclic graph can also be used to automatically handle the object dependencies during snapshot and restore of a state machine of the migrating system.

When the DAG is generated and displayed as an interface, the DAG allows a user to make decisions based on the displayed dependencies and select which sub-sections to migrate and how to migrate by choosing a deep copy or a shallow copy.

Prior systems were limited and only operated by copying and dumping the entire system for migration. The present system allows for selection of sub-systems for more efficient migration. The directed acyclic graph allows for selection of the state machine components at different levels of granularity. For example, the graphical dependencies shown by the directed acyclic graph provide both an outside-in approach during migration (by way of allowing selecting a compute pipeline as the grain) and an inside-out approach during migration (by way of allowing selection of objects as the grain). The system determines and generates a directed acyclic graph that includes all dependencies of objects. This directed acyclic graph can be displayed as an interface used for in-place approval and selection of a subset of objects that can assist environment migration and state-machine reproduction without the need for extensive testing and validation effort for the enterprise. This enhances automation for cloud deployments by requiring very little or no manual intervention.

The processes described in the background above are rendered redundant with the present innovation. In one embodiment, the system and method generates a visual representation of object dependencies. The directed acyclic graph representation of dependency relationships is evident and intuitive. Using the DAG-based approach, audit of a compute pipeline or object to be migrated (or that has been migrated) is greatly simplified. The pipeline or object can be visually audited in-place for example by a simple 4-eye (two reviewer) process. The state image of the pipeline or object(s) is validated using DAG-based validation by comparison of vertices (representing the objects) and links (representing the dependencies), as well as values of attributes associated with the objects. Thus, using the directed acyclic graph to assist generation of state-machine snapshot is highly efficient, traceable and provides for automation and rapid restoration of state-image ready for execution.

This offers advantages for both local (for example, on-premise) and cloud deployments of the pipeline or object. In one embodiment, the system and methods cut down what is a multi-man-month effort in managing multiple environments of complex analytical systems down to matter of hours or days. This is a significant differentiator over alternative solutions, especially with cloud-based migrations and deployments. In one embodiment, the system and method includes analytics pipeline state-machine snapshot generation and replication or restoration with automatic validation and visual audit and trace.

In one embodiment, each step of computer-implemented methods described herein may be performed by a processor (such as processor 910 described with reference to FIG. 9) of one or more computing devices (i) accessing memory (such as memory 915 and/or other computing device components described with reference to FIG. 9) and (ii) configured with logic to cause the system to execute the step of the method (such as dependency graph-controlled object and compute pipeline migration logic 930 described with reference to FIG. 9). References to storage or storing indicate storage as a data structure in memory or storage/disks of a computing device (such as memory 915, or storage/disks 935 of computing device 905 or remote computers 965 described with reference to FIG. 9).

In one embodiment, each subsequent step of a method commences in response to parsing a signal received or stored data retrieved indicating that the previous step has been performed at least to the extent necessary for the subsequent step to commence. Generally, the signal received or the stored data retrieved indicates completion of the previous step.

Use of DAG GUI to Facilitate Selection of Deep or Shallow Copy

Figure 2:
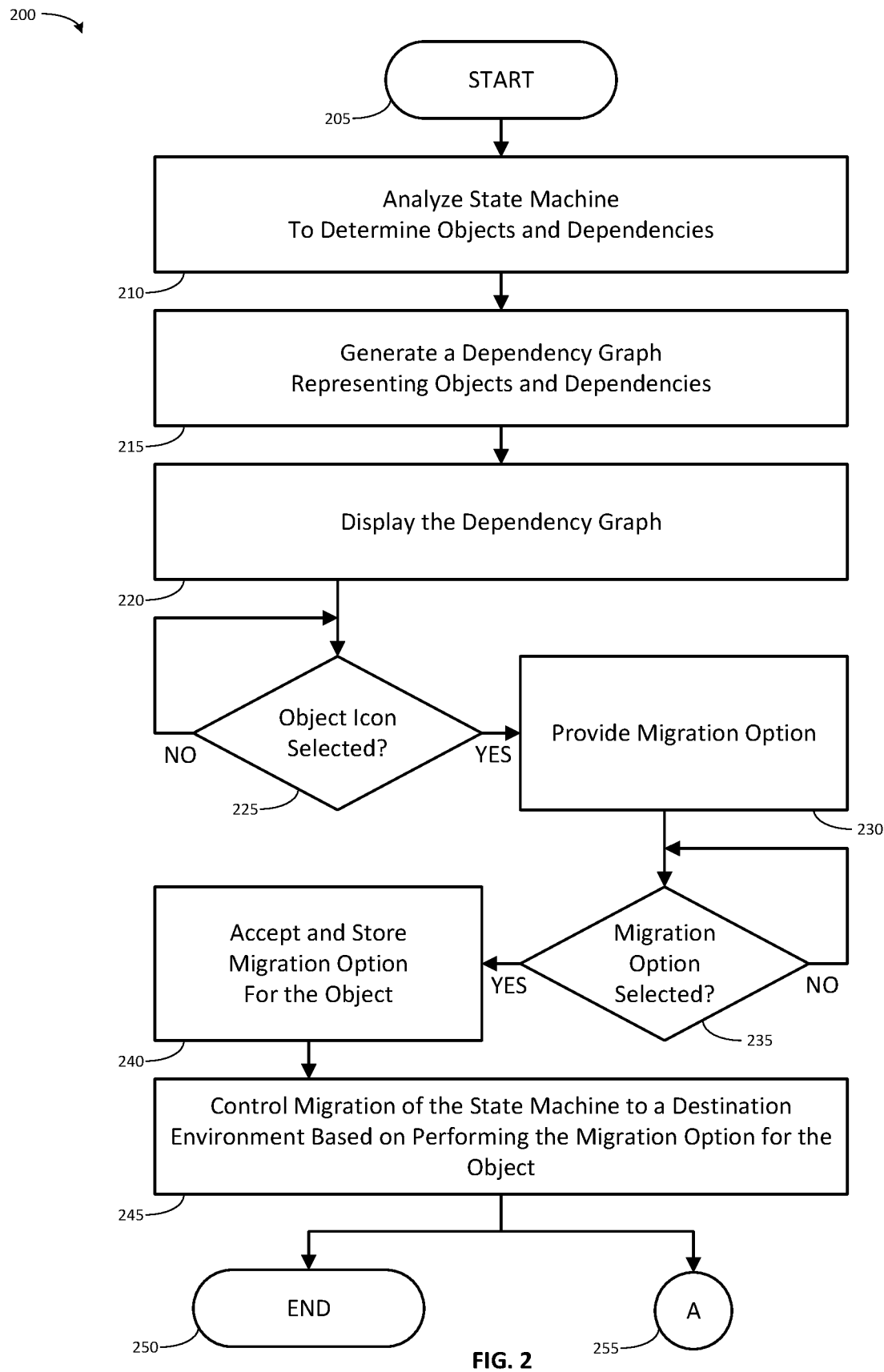
FIG. 2 illustrates one embodiment of a method associated with migration of objects and compute pipelines using a dependency graph interface.

FIG. 2 shows one embodiment of a computer-implemented method 200 associated with dependency graph-controlled object and compute pipeline migration. The method 200 describes steps for migrating an object or compute pipeline from a source environment, such as source environment 105, to a target environment, such as target environment 130.

Figure 10:
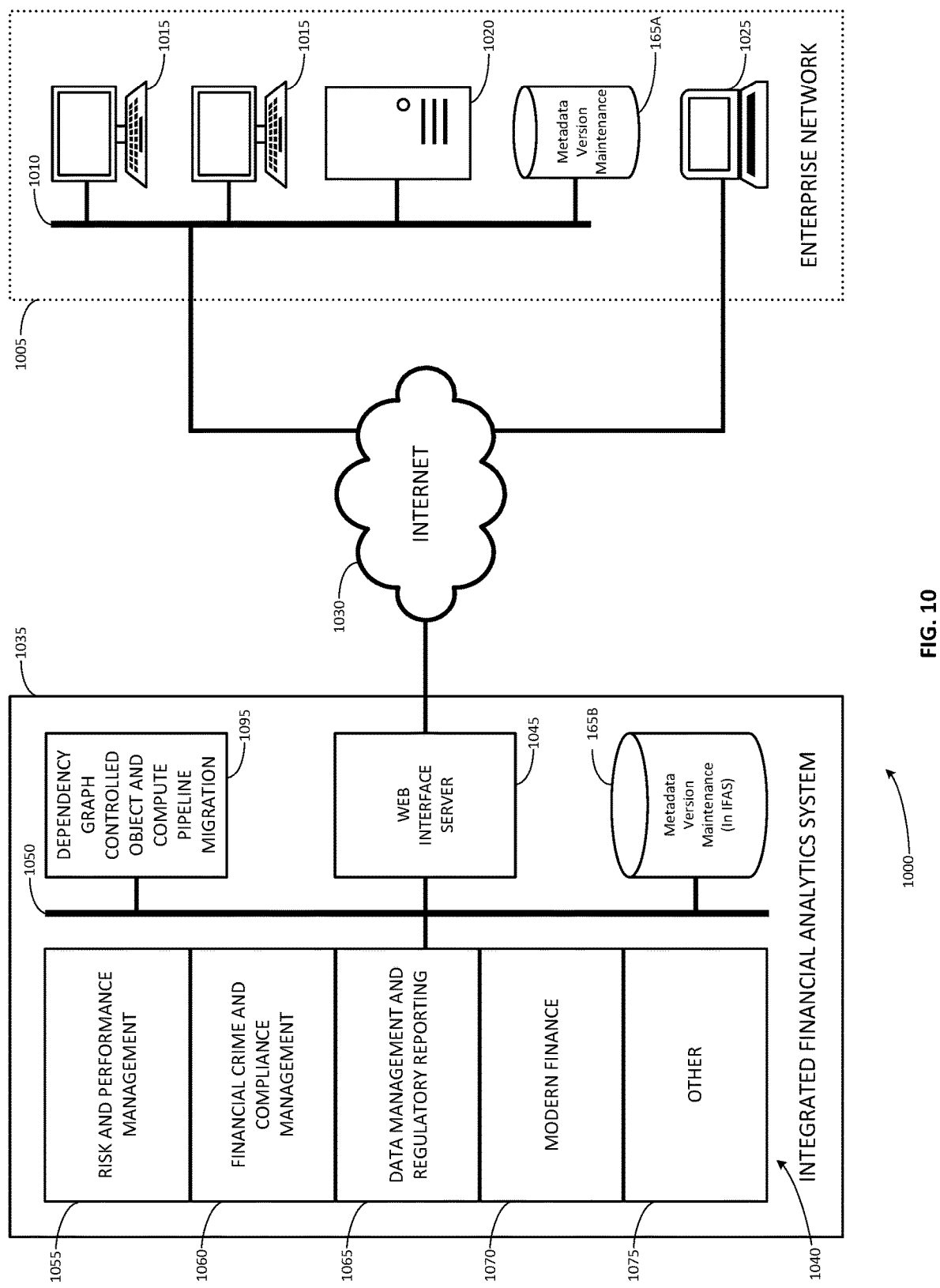
FIG. 10 illustrates one embodiment of a multi-tenant system including migration of objects and compute pipelines using a dependency graph interface.

The method 200 may be initiated based on various triggers, such as receiving a signal over a network or parsing stored data indicating that (i) a user (or administrator) of an analytic system (such as an analytic system included in the integrated financial analytics system 1035 discussed herein with reference to FIG. 10) has initiated method 200, or (ii) that that method 200 is scheduled to be initiated at defined times or time intervals, for example to commence creation of a backup snapshot of one or more objects in the analytic system. In some embodiments, the method is initiated on a periodic schedule (daily, weekly, bi-weekly, monthly, etc.) in accordance with trigger (ii) above. The method 200 initiates at start block 205 in response to parsing a signal received or stored data retrieved and determining that the signal or stored data indicates that the method 200 should begin. Processing continues to process block 210.

At process block 210, the processor analyzes a state machine to determine (i) objects of the state machine and (ii) dependencies between the objects of the state machine. The processor may do so by first accepting an input identifying the state machine to be analyzed. The input may be a selection of a higher order entity (such as an application-run, an end-to-end process pipeline, or other compute pipeline) from a menu of higher order entities available in the analytic system. The processor may then parse the higher order entity to determine the objects included and the dependencies of those objects.

In one embodiment, objects used in an analytic system are built out of an object model that enforces a uniform set of attributes to describe each object. Generally, these attributes describe each object in terms of: (1) what parts of the analytic system (such as other objects and compute pipelines) the object uses; (2) what parts of the analytic system the object is used in; (3) entitlements or permissions required for using the object; (4) audit properties of the object; (5) domain association of the object; (6) version of the object; and (7) any derived attribute set derived from inclusion of the object in a compute pipeline, including, for example, the input and/or output connections to other objects in the compute pipeline and the input and output data of the object. This configuration of the objects with uniform metadata attributes allows for a metadata schema to be easily represented in a graph-based relationship encoding format.

For example, each object in the analytic system may include, in addition to the code and data for performing the functionality of the object, the following metadata:

A vector of references to specific objects upon which the object depends (satisfying item 1 above).

A vector of references to specific objects that depend upon the object (satisfying item 2 above).

A data structure defining permissions required to use the object (satisfying item 3 above).

A data structure defining the audit properties of the object (satisfying item 4 above).

A data structure defining the domain association of the object (satisfying item 5 above).

A version identifier value for the object (satisfying item 6 above).

A data structure defining all derived attribute sets derived from inclusion of the object in a compute pipeline (satisfying item 7 above).

A data structure including (a) a tag identifier field indicating inclusion (or not) of the object in a particular export or import process; and (b) a migration option field indicating deep copy or shallow copy of the object for the particular export or import process (these features are discussed in further detail below). To accommodate multiple export and/or import processes, this may include a vector of data structures including items (a) and (b).

In one embodiment, to determine the objects of the state machine, the processor may, starting with the first object of the state machine (such as the first object in a compute pipeline): (i) retrieve the object from an object repository associated with the analytic system, (ii) record the object by appending an identifier of the object to a list, and then (iii) parse the metadata of the object in the state machine to retrieve a value identifying the output connection to the next object in the state machine. The processor may then repeat this retrieve, record, and parse process through all objects of the state machine until the output connection value for an object is NULL or otherwise indicates that there are no further objects in the state machine. The list of identifiers of the objects may be stored for later retrieval.

In one embodiment, to determine the dependencies between the objects of the state machine, the processor may, for each object in the list, parse the metadata of the object to retrieve (i) the vector of references to specific objects upon which the object depends and (ii) an identifier for the input connection to the object, if any. The vector of references and the input connection for the object may be associated with the identifier for the object in the list, and stored for later retrieval. Thus, a list of identifiers of objects associated with vectors identifying all dependencies of the objects and identifiers of inputs to the objects is formed and stored for later retrieval. (In one embodiment, the identifiers of inputs to the objects is redundant, as the input may be included in the vector identifying dependencies).

In one embodiment, the parsing and retrieval of the dependency vector and the input connection may occur as further steps of the list creation above, and in another embodiment, the parsing and retrieval of the dependency vector and the input connection may occur subsequent to the creation of the list.

Once the processor has thus analyzed the state machine to determine (i) the objects of the state machine and (ii) the dependencies between the objects of the state machine, processing at process block 210 completes, and processing continues to process block 215.

In one embodiment, the system and method analyze data from the state-machine or system being migrated and generate a dependency graph, such as a directed acyclic graph, to represent the state of the objects that make up the higher order entity (such as an application-run, an end-to-end process pipeline, or other compute pipeline). At process block 215, the processor generates a dependency graph representing the objects and the dependencies between the objects. This provides a graphical representation of the dependencies between the objects available for the migration and allows selection (tagging) of sub-sections of objects for migration.

The dependency graph may be generated from the list of identifiers of objects associated with vectors identifying all dependencies and inputs. The processor retrieves the list from storage. For each object identified in the list, the processor (i) forms a node, (ii) forms a further node for each dependency object included in the vector for which a node does not already exist in the dependency graph (avoiding duplicate nodes), and forms a directional edge between the node and each further node if the edge does not already exist (avoiding duplicate edges), (iii) forms an additional node for the input object if that node does not already exist in the dependency graph (avoiding duplicate nodes), and forms a directional edge between the node and the additional node if the edge does not already exist (avoiding duplicate edges). (In one embodiment where the input object is already included in the vector of dependencies, the third step of forming the additional node is unnecessary.) The direction of the edge indicates the direction of the dependency—the node depends from the further/additional nodes.

In one embodiment, the locations of nodes and edges of the dependency graph may be plotted for display by suitable algorithms or software packages. For example, the dependency graph may be plotted by an algorithm or software package designed to minimize edge crossings. In another example, the direction of the edge follows the following convention leftward objects depend on rightward objects, where traversing the dependency graph from left to right moves from objects with the highest number of layers of dependency to objects having no dependencies. Alternatively, the edge could include an arrow indicating directionality.

In one embodiment, (i) forming the nodes and edges, and (ii) plotting the locations of nodes and edges completes the dependency graph representing the objects and the dependencies between the objects. The dependency graph is stored for later retrieval.

In one embodiment, the processor generates the dependency graph as a directed acyclic graph.

Once the processor has thus generated the dependency graph representing the objects and the dependencies between the objects, processing at process block 215 completes, and processing continues to process block 220.

At process block 220, the processor displays the dependency graph on a display device. In the dependency graph, the objects are represented by selectable icons. In one embodiment, the dependency graph can be shown on a display device and be used as a graphical user interface to accept user inputs. In one embodiment, the processor retrieves the dependency graph from storage. The processor also retrieves selectable icons appropriate for representing the type of objects included at the nodes of the dependency graph from storage. The processor then generates a signal that causes the display device to display the dependency graph with the appropriate selectable icons at the nodes of the graph.

Figure 3:
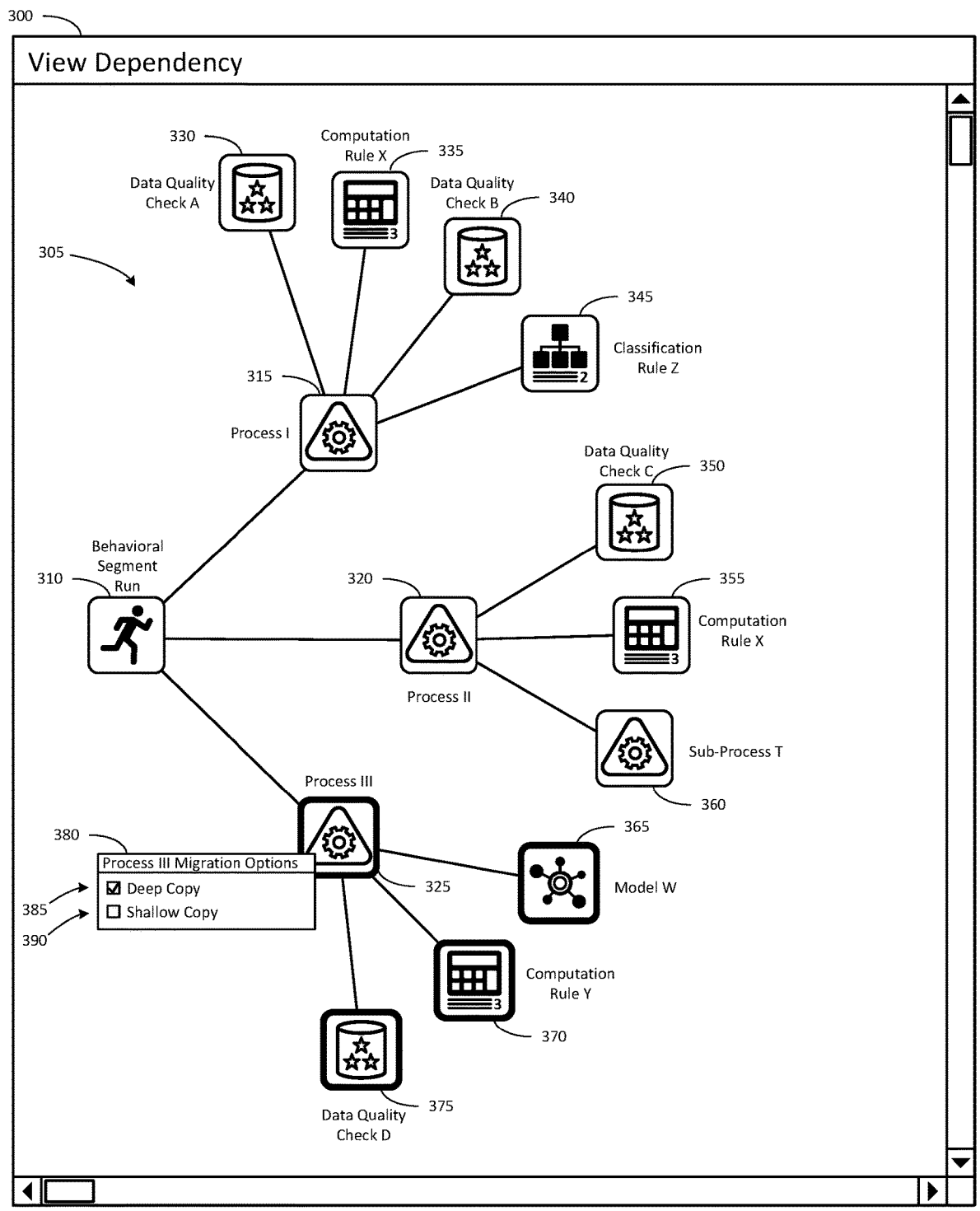
FIG. 3 illustrates one embodiment of a graphical user interface suitable for presentation on a display device and associated with displaying a dependency graph of all dependencies between objects for an example state machine.

Referring now to FIG. 3, FIG. 3 shows one embodiment of a graphical user interface 300 suitable for presentation on a display device and displaying a dependency graph 305 of all dependencies between objects 310-375 for an example state machine. The dependency graph 305 is a directed acyclic graph view of the state machine with dependencies, commonalities, and relationships between objects shown. The dependency graph 305 represents the full state of the objects ecosystem (shown by object-to-object links in the dependency graph) for the chosen pipeline and allows for evaluation of dependencies.

In this example, the dependency graph 305 shows a sub-set of objects and dependencies in the analytic system for an example pipeline "Behavioral Segment Run." This pipeline exists in the analytic system as an object, and is assigned a node in the dependency graph as discussed with reference to process block 215. In the displayed dependency graph 305, the pipeline is represented by Behavioral Segment Run selectable icon 310 at the location of the node for the pipeline.

The behavioral segment run pipeline in the analytic system includes Process I, followed by Process II, followed by Process III. Each of these processes exists as an object in the analytic system. Each of these processes is assigned a node in the dependency graph and is connected by an edge to the node for the Behavioral Segment Run, as discussed with reference to process block 215. In the displayed dependency graph 305, Process I is represented by Process I selectable icon 315 at the location of the node for Process I in the graph, Process II is represented by Process II selectable icon 320 at the location of the node for Process II in the graph, and Process III is represented by Process III selectable icon 325 at the location of the node for Process III in the graph. Each of selectable icons 315, 320, and 325 are connected by an edge to Behavioral Segment Run selectable icon 310, representing the dependency of the Behavioral Segment Run on these three processes.

In the analytic system, Process I depends on the objects Data Quality Check A, Computation Rule X, Data Quality Check B, and Classification Rule Z. Each of these objects in the system is assigned a node in the dependency graph and is connected by an edge to the node for Process I, as discussed with reference to process block 215. In the displayed dependency graph 305, Data Quality Check A is represented by Data Quality Check A selectable icon 330 at the location of the node for Data Quality Check A, Computation Rule X is represented by Computation Rule X selectable icon 335 at the location of the node for Computation Rule X, Data Quality Check B is represented by Data Quality Check B selectable icon 340 at the location of the node for Data Quality Check B, Data Quality Check B Classification Rule Z is represented by Classification Rule Z selectable icon 345 at the location of the node for Classification Rule Z. Each of the selectable icons 330-345 are connected by an edge to Process I selectable icon 315.

Similarly, the objects upon which Process II depends are represented as Data Quality Check C selectable icon 350, Computation Rule X selectable icon 355, and Sub-Process T selectable icon 360; and the objects upon which Process III depends are represented as Model W selectable icon 365, Computation Rule Y selectable icon 370, and Data Quality Check D selectable icon 375. These icons are placed at the appropriate nodes and connected by edges to processes I and II as appropriate based on the process described with reference to process block 215.

Referring again to FIG. 2, once the processor has thus displayed the dependency graph on the display device, processing at process block 220 completes, and processing continues to decision block 225.

At decision block 225, the processor evaluates an input into the computing device to determine if any selectable icon representing an object is selected. If the input does not indicate selection of a selectable icon representing an object (NO), then the processing at decision block 225 repeats for the next input into the computing device. If the input indicates selection of a selectable icon representing an object (YES), then processing at decision block 225 completes and processing continues to process block 230. In one embodiment, the user inputs considered at decision block 225 are user inputs into the dependency graph based graphical user interface. When the system focus is not on this user interface, the user inputs may be ignored. In one embodiment, the input may be a click from a cursor control device such as a mouse or touch screen—a click when the cursor is placed over a selectable icon would result in a selection, while a click when the cursor is not placed over a selectable icon would not. In one embodiment, the input may be a sequence of keystrokes.

At process block 230, in response to a selection of a particular selectable icon, the processor provides a migration option for an object represented by the selectable icon. The migration option provided includes at least a selection between either a deep copy or a shallow copy for the object represented by the selectable icon.

Referring again to FIG. 3, the dependency graph 305 view shows all dependencies and allows the graphical user interface 300 to accept user inputs to select a deep copy option or a shallow copy option for migration of one or more objects of the state machine. In one embodiment, the processor determines that a selectable icon representing an object is selected. In response, the processor retrieves a migration options menu associated with that object from storage. The migration options menu includes at least options for deep copy and shallow copy of the object. The processor generates a signal that causes the display to show the migration options menu in the graphical user interface 300. For example, selection of Process III selectable icon 325 results in the presentation of Process III Migration Options menu 380 on the display device. Process III Migration Options menu 380 includes a selectable "Deep Copy" option 385 and a selectable "Shallow Copy" option 390.

Referring again to FIG. 2, once the processor has thus provided the migration option for the object represented by the selectable icon, processing at process block 230 completes, and processing continues to decision block 235.

At decision block 235, the processor evaluates an input into the computing device to determine if a migration option has been selected. If the input does not indicate selection of a migration option (NO), then the processing at decision block 225 repeats for the next input into the computing device. If the input indicates selection of a migration option (YES), then processing at decision block 235 completes and processing continues to process block 240. In one embodiment, the user inputs considered at decision block 235 are user selections from the menu displayed at process block 230 in the dependency graph based graphical user interface. When the system focus is not on this user interface, the user inputs may be ignored.

At process block 240, the processor stores the selection of the migration option for the object represented by the particular selectable icon.

In one embodiment, the processor determines whether the selected migration option indicates a deep copy or a shallow copy for the object. The processor then writes a value indicating deep copy or shallow copy to a migration option field in the metadata of the object.

Further, in one embodiment, an object or compute pipeline may be 'tagged' for inclusion in an export for archive or migration. Such 'tagging' includes applying a designation to the object or objects in a compute pipeline that indicates that it should be included in a specific export. In one embodiment, object 'tagging' and state machine snapshot creation of objects and groups of objects may occur at the highest level of granularity. For example, a snapshot may be taken at the application-run grain or end-to-end process pipeline grain. This is a convenient way to get a usable snapshot, as no dependencies are likely to be omitted. Such a snapshot can be restored in a target environment to form an execution ready state-machine.

In one embodiment, selecting either of the deep copy or shallow copy options for an object causes the object to be tagged for export. In one example, where selecting the deep copy or shallow copy option causes the object to be tagged for export, the processor further writes a value indicating a particular export session to a tag identifier field in the metadata of the object.

Referring again to FIG. 3, in one embodiment, objects tagged for export using the graphical user interface 300 may be represented by modifying the selectable icons that represent the objects in the dependency graph 305. For example, the outline of the selectable objects may be bolded if the object is selected for deep copy or shallow copy, as shown by Process III selectable icon 325, Model W selectable icon 365, Computation Rule Y selectable icon 370, and Data Quality Check D selectable icon 375. The modification of the selectable icons to indicate tagging for export may be based on the value stored in the tag identifier field in the metadata of the object.

Referring again to FIG. 2, once the processor has thus accepted and stored the selection of the migration option for the object represented by the particular selectable icon, processing at process block 240 completes, and processing continues to process block 245.

At process block 245, the processor controls the migration of the state machine to a target environment based at least in part on performing the migration option for the object represented by the particular selectable icon.

In one embodiment, the processor parses each object in the state machine to determine if it is tagged for export (that is, to determine the presence of the value indicating the particular export session to in the tag identifier field in the metadata of the object). For each object that is tagged for export, the processor further parses the object to determine whether a deep copy or a shallow copy of the object is indicated. The processor then configures an export process (such as the Oracle® EXP tool) to export each tagged object consistent with the indication of a deep copy or of a shallow copy for the object.

A deep copy of an object is a full instantiation of the object with all its attributes against a new identifier. In one embodiment, if the original object had references (links) to the dependent objects, the deep copy will also have references. In one embodiment, the choice exists to also make a deep copy of the dependent objects when the holding object is deep copied. For example, this choice may be presented to the user. In one embodiment, the deep copy will follow the pattern of the original object to determine whether to hold references or full image of the dependent objects. In one embodiment, a deep copy of an object includes copying the actual target data of the object, as well as automatically versioning the underlying objects, during an export of the object.

A shallow copy involves copying only references (links) to the target data of the object during an export of the object. The shallow copy operation creates a new instance of the object, but for attributes of the new instance, the shallow copy operation provides only references to the attributes of the original object. This means any changes done to the original object will be reflected in the copy as well.

In one embodiment, the system and method may include an auto-versioning function. The auto-versioning function automatically increments the version of a target object during a save, copy, or export operation on that object. In one embodiment, the auto-versioning function writes the version information to the metadata of the saved, copied, or exported object.

Thus, the dependency graph allows for evaluation of dependencies and drives the choice between deep copy and shallow copy in generating a state-machine snapshot by selecting an object (represented by icons) in the graph.

The processor then executes the export process to create an archive dump file for the exported state machine. The processor may transmit the archive dump file directly to an import process at a target environment, as described for reference 135, or the processor may transmit the archive dump file to a metadata version maintenance system, as described for reference 145.

In one embodiment, the system and method may include a tagging function. Computing ecosystems (or environments, such as the analytic system) may continue to evolve or change over time. Tagging a state-machine refers to labeling the current version of objects within an ecosystem with a tag identifier (tag ID) that describes or identifies a particular state of the ecosystem. Each tag refers to a full state of all objects in the ecosystem. Applying a tag allows for the ecosystem to be restored back to a particular state as referred to by the selected tag. Each time an ecosystem is tagged, all objects as of their current version are labeled with the tag ID. These tags may be applied to objects at all levels of granularity.

Even after a tag is applied to objects in an ecosystem, the ecosystem may continue to evolve or change. There may be continuous updates to the objects or the ecosystem resulting in new versions of the underlying objects in the ecosystem. Accordingly, in one embodiment, the ecosystem can be repeatedly tagged. In one embodiment, multiple tags can exist in a ecosystem but typically there is only one active tagged state for production use.

In one embodiment, the tag ID is stored as a value in the tag identifier field included in the metadata of the object (as discussed above). In a further embodiment where multiple tags may exist, the tag identifier field may be included in a vector or linked list of multiple such fields, configured to store multiple tag IDs, enabling the use of multiple tags in the ecosystem.

An export dump can be created based on any tag or label in the ecosystem, for example by parsing the metadata of the objects for tag IDs that match the tag or label. Such an export dump can be used to restore a point in time state in a target environment (restore based on a tag). Tagging does not create an export dump by default. Instead, export dump creation is a specifically directed action to extract out the state of the system. In one embodiment, such an export may be based on a tag or label for restoration in a target environment to reflect a valid state of the system for use in the target environment.

Once the processor has thus controlled the migration of the state machine to the target environment, processing at process block 245 completes, and processing continues to END block 250, where processing completes. Alternatively, processing may continue to connector A 255, where method 400 begins.

In one embodiment, where the target environment is a cloud system, there is an operable connection from the processor and memory to each of (i) the origin environment that hosts the state machine, and (ii) the target environment. For example, this operable connection may be through a network.

Thus, in one embodiment, the system and method provides unique features and solutions for an enterprise ecosystem that allows the system to manage state-machine snapshot capture, migration of objects, and replication of objects in another environment, which can be imported as an automatically validated system for immediate execution. For example, the generated DAG provides a number of benefits over previous migration methods: visual audit; full trace of the higher and lower order objects; ability to review in-place cross-use; four-eye (two-man) review and approvals; and an ability to compare DAGs with properties at vertices and links to validate a restored image in the target environment. Restoring a tagged state dump in a target environment is thus guaranteed to leave the systems in a consistent state and ready for execution. The present technical process obviates the need for extensive regression testing cycle.

Enabling Comparison Between Origin and Target Environment Objects

In one embodiment, one or more objects in the dependency graph of the compute pipeline to be migrated may have been included in another compute pipeline that is already present in the target environment (for example, because the other compute pipeline was previously migrated to the target environment). A choice may be presented to the user to (i) use one or more of the objects that are already in the target environment for the compute pipeline to be migrated, or (ii) tag all the objects of the state-machine to be migrated for migration, migrating a deep copy of all dependent objects, and generating a dump with the tag identifier. To assist the user in making the choice, the system and method allows the user to compare objects in the origin environment with objects in the destination environment.

Figure 4:
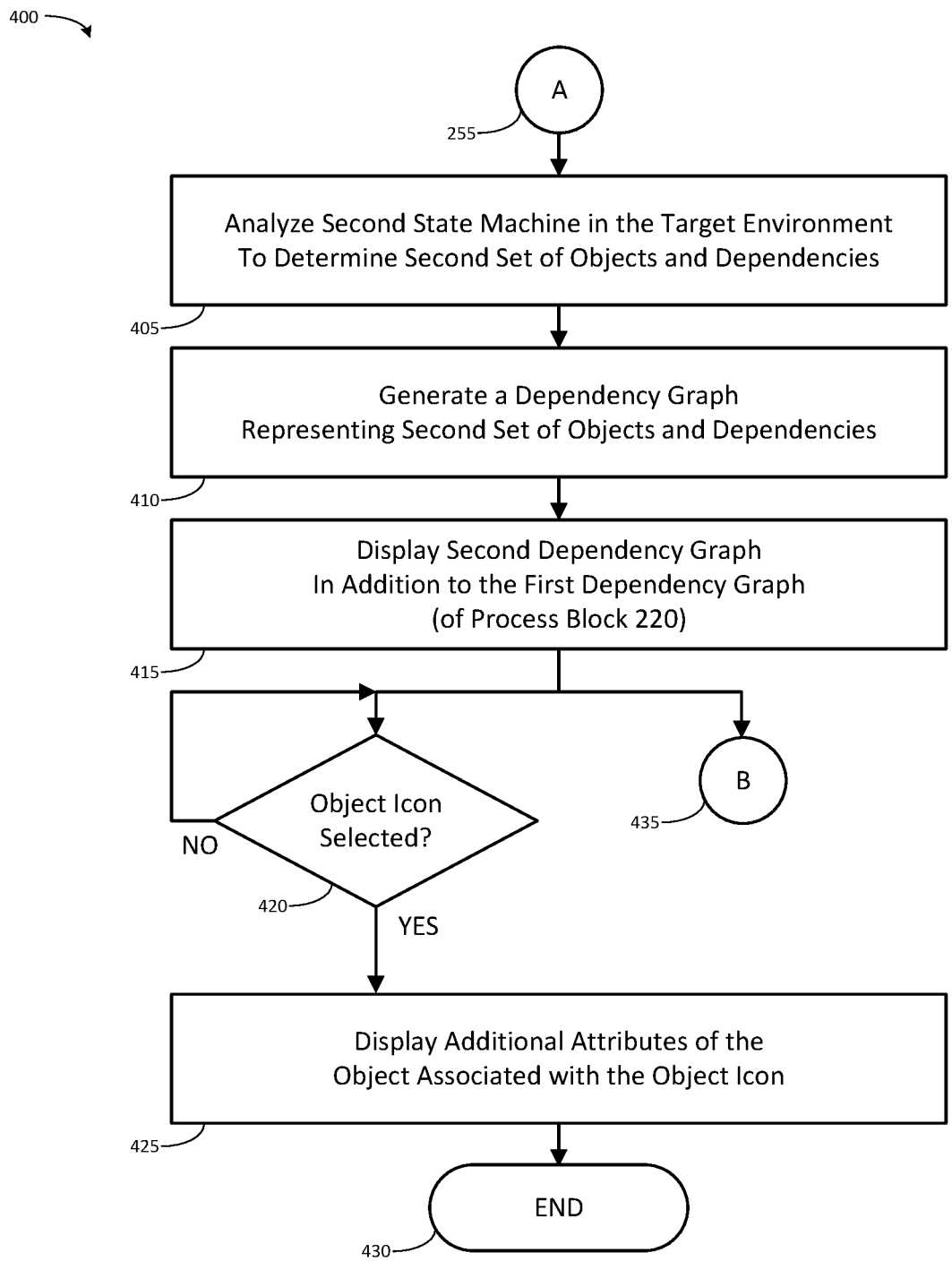
FIG. 4 illustrates one embodiment of a computer-implemented method associated with dependency graph-controlled object and compute pipeline migration, and more particularly associated with comparing objects in an origin environment with objects in a target environment.

FIG. 4 shows one embodiment of a computer-implemented method 400 associated with dependency graph-controlled object and compute pipeline migration, and more particularly associated with comparing objects in an origin environment with objects in a target environment. The method 400 continues from method 200 at connector A 255. The method 400 may be initiated based on various triggers, such as receiving a signal over a network or parsing stored data indicating that (i) a user (or administrator) of an analytic system (such as an analytic system included in the integrated financial analytics system 1035 discussed herein with reference to FIG. 10) has initiated method 200 and wishes to view objects in a target (destination) environment for a state machine. The method 400 proceeds from connector 255 to process block 405.

At process block 405, the processor analyzes a second state machine existing in the target environment to determine (i) second objects of the second state machine and (ii) second dependencies between the second objects of the second state machine. The second state machine is analyzed in a similar manner as described with reference to process block 210 of FIG. 2, above. The analysis results in a list of object identifiers, with each object identifier in the list associated with one or more additional objects upon which the object referred to by the object identifier depends. Once the processor has thus analyzed the second state machine, processing at process block 405 completes, and processing continues to process block 410.

At process block 410, the processor generates a second dependency graph representing the second objects and the second dependencies between the second objects. The second dependency graph is generated in a similar manner as described with reference to process block 215 of FIG. 2, above. The generation results in a second dependency graph composed of nodes for each unique object in the environment of the second state machine, and edges between the nodes indicating the dependency of the node. In one embodiment, the locations and edges of the second dependency graph may be plotted for display as described with reference to process block 215. Once the processor has thus generated the second dependency graph, processing at process block 410 completes, and processing continues to process block 415.

At process block 415, the processor displays the second dependency graph on the display device in addition to the dependency graph. Here, the second objects are represented by selectable icons. Both the dependency graph and the second dependency graph are displayed in a similar manner to that described with reference to process block 220 of FIG. 2, above. In one embodiment, the dependency graph and the second dependency graph are displayed together. For example, the dependency graph and the second dependency graph may be displayed simultaneously. For example, the dependency graph and the second dependency graph may be displayed alongside one another. Other embodiments of displaying the second dependency graph in addition to the dependency graph are also contemplated.

Figure 5:
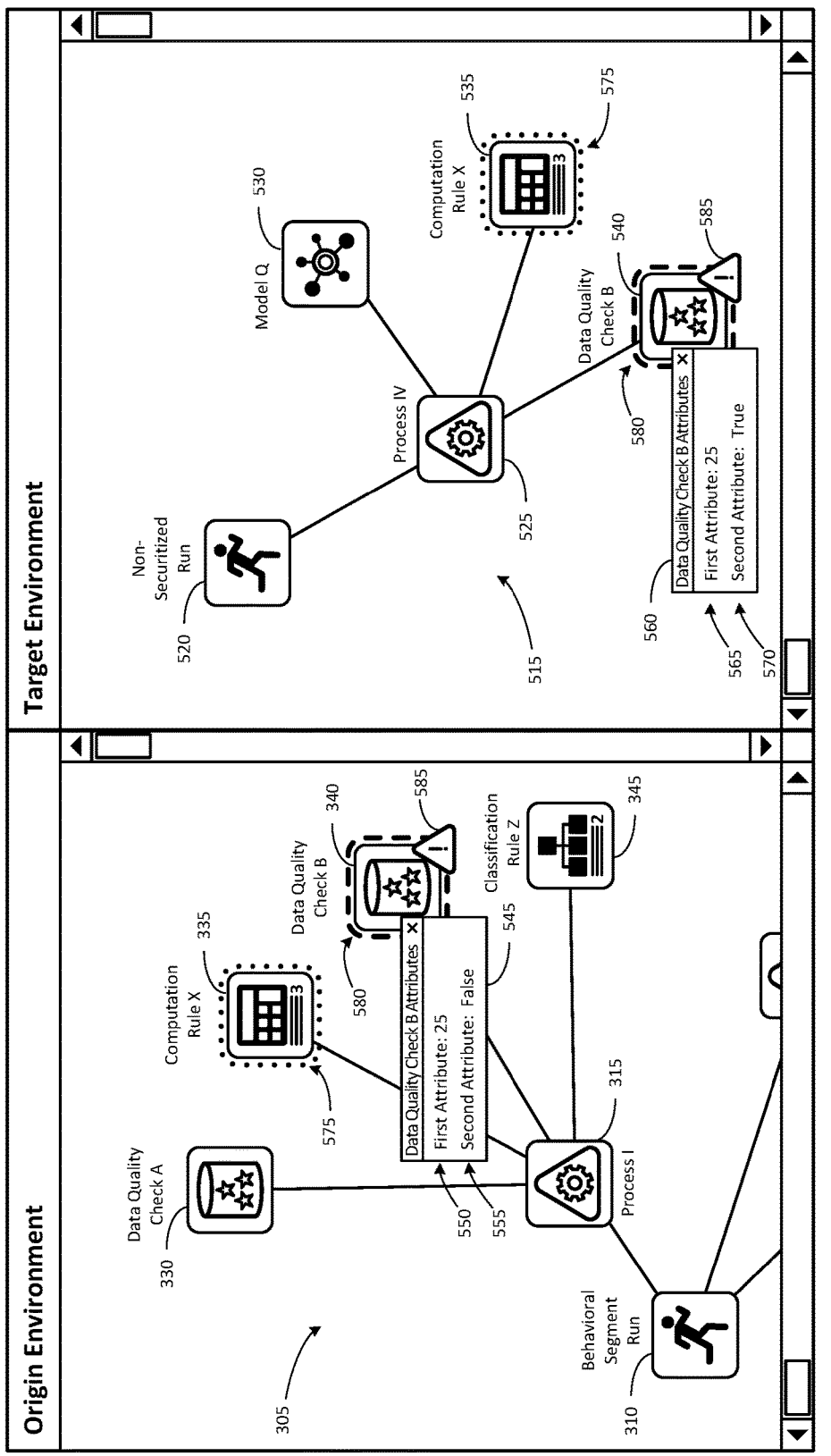
FIG. 5 illustrates one embodiment of a graphical user interface suitable for presentation on a display device and associated with showing an origin environment view of a dependency graph alongside a target environment view of a second dependency graph.

Referring now to FIG. 5, FIG. 5 shows one embodiment of a graphical user interface 500 suitable for presentation on a display device and showing an origin environment view 505 of the dependency graph 305 alongside a target environment view 510 of an example second dependency graph 515. In this example, the second dependency graph 515 shows a sub-set of objects and dependencies in the analytic system of the target environment. The sub-set of objects and dependencies of second dependency graph 515 is for an example pipeline "Non-Securitized Run." This pipeline exists in the analytic system of the target environment as an object, and is assigned a node in the second dependency graph as discussed with reference to process block 410 of FIG. 4. In the displayed second dependency graph 515, the pipeline is represented at the node by Non-Securitized Run selectable icon 520.

The Non-Securitized Run pipeline includes, and therefore depends upon, Process IV. Process IV also exists as an object in the analytic system of the target environment, and is similarly assigned a node and represented at that node by Process IV selectable icon 525. Process IV depends upon Model Q, Computation Rule X, and Data Quality Check B, each of which exists as an object in the analytic system of the target environment, is assigned a node, and is represented at its node by Model Q selectable icon 530, Computation Rule X selectable icon 535, and Data Quality Check B selectable icon 540, respectively.

Referring again to FIG. 4, once the processor has thus displayed the second dependency graph on the display device in addition to the dependency graph, processing at process block 415 completes, and processing continues to decision block 420.

At decision block 420, the processor the processor evaluates an input into the computing device to determine if any selectable icon representing an object is selected. If the input does not indicate selection of a selectable icon representing an object (NO), then the processing at decision block 420 repeats for the next input into the computing device. If the input indicates selection of a selectable icon representing an object (YES), then processing at decision block 420 completes and processing continues to process block 425. In one embodiment, the input selecting the selectable icon may be of a different form than the selection described with reference to decision block 225 of FIG. 2. For example, where the selection input of decision block 225 may be a primary input of the cursor control device such as a left click of a mouse (or a tap of a touchscreen) over the selectable icon, the selection input in process block 425 may be a secondary input of the cursor control device such as a right click or control+click of the mouse (or touch-and-hold of the touchscreen) over the selectable icon.

At process block 425, in response to a selection of the particular selectable icon, the processor displays additional attributes of the object or second object represented by the particular selectable icon. In one embodiment, the processor determines that a selectable icon representing an object has been selected. In response, the processor retrieves an attributes menu from storage. The processor then parses the object to identify attributes of the object to be displayed on the attributes menu. The processor then generates a signal that causes the display to show the attributes menu in a graphical user interface.

Referring again to FIG. 5, a user selection of Data Quality Check B selectable icon 340 of the origin environment (for example, by secondary input of the cursor control device such as a mouse right click) causes an attribute menu 545 associated with that object to appear. The attribute menu 545 shows attributes of Data Quality Check B object, such as First Attribute 550 and Second Attribute 555. Attribute menu 545 may remain open until affirmatively closed by user input (for example, by selection of the "x" in the upper right-hand corner of attribute menu 545) to allow comparison of the attributes with the attributes of other objects. For example, a second attribute menu 560 may be opened for Data Quality Check B selectable icon 540 of the target environment, and the user may compare the attributes. For example, first attribute 565 may be compared with first attribute 550, and second attribute 570 may be compared with second attribute 555.

In one embodiment, access to the attributes menu (for example menus 545 and 560) may be provided in response to the secondary input of the cursor control device for any object (such as those shown with reference to FIG. 3), regardless as to whether objects of a destination environment are shown in a second dependency graph.

Referring again to FIG. 4, once the processor has thus displayed additional attributes of the object or second object represented by the particular selectable icon, processing at process block 425 completes, and processing continues to END block 430, where processing completes.

Alternatively, following the completion of process block 415, processing may continue to connector B 435, where method 440 begins.

Figures 4A, 4B:
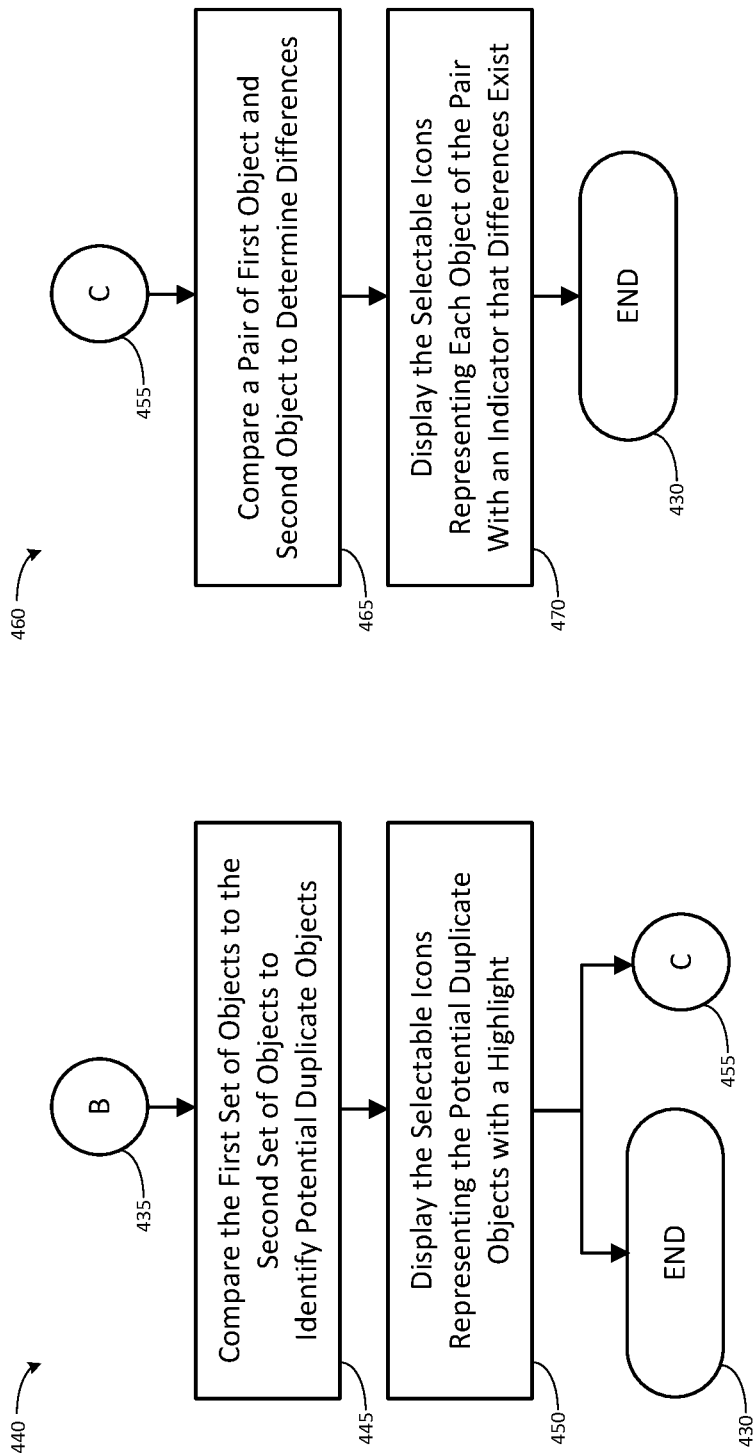
FIG. 4A illustrates one embodiment of a computer implemented method associated with comparing objects in an origin environment with objects in a target environment, and in particular with identifying potential duplicate objects.
FIG. 4B illustrates one embodiment of a computer implemented method associated with comparing objects in an origin environment with objects in a target environment, and in particular with identifying differences between potential duplicate objects.

FIG. 4A shows an embodiment of a computer implemented method 440 associated with comparing objects in an origin environment with objects in a target environment, and in particular with identifying potential duplicate objects. The method 440 continues from method 400 at connector B 435. Method 440 may be initiated in response to various triggers, for example receiving a signal over a network or parsing stored data indicating that processing at process block 415 described with reference to FIG. 4 has completed. The method 440 proceeds from connector B 435 to process block 445.

At process block 445, the processor compares the objects of the state machine to the second objects of the second state machine to identify potential duplicate objects. In one embodiment, for each object of the state machine and for each second object of the second state machine, the processor parses the object or second object to identify one or more attributes of the object or second object. The processor then compares the attributes of each object with the attributes of each second object to identify matches. The processor then applies a label in metadata to each object and second object in a pair identified as a match that indicates the pair to be potential duplicates. In another embodiment, the processor compares only the name of each object against the name of each second object, identifying as potential duplicates those pairs that share a name.

In one embodiment, each object has a common set of attributes such as the uniform metadata attributes described with reference to process block 210 of FIG. 2. Here, the comparison of the objects of the state machine to the second objects of the second target state machine may include a comparison of values of one or more of the common attributes between the objects and the second objects.

Once the processor has thus compared the objects of the state machine to the second objects of the second state machine to identify the potential duplicate objects, processing at process block 445 completes, and processing continues at process block 450.

At process block 450, the processor displays the selectable icons representing the potential duplicate objects with a highlight to indicate the potential duplicates. In one embodiment, the processor parses the objects and second objects to identify each pair labeled in metadata as being potential duplicates. The processor then generates a signal that causes the display to show the selectable icons representing a pair of potential duplicates with a highlight. Where there exists multiple pairs of potential duplicates, each pair of selectable icons may be shown with a different highlight. For example, each pair may be shown highlighted with a unique color.

Referring again to FIG. 5, (i) Computation Rule X selectable icon 335 in the origin environment and Computation Rule X selectable icon 535 in the target environment, and (ii) Data Quality Check B selectable icon 340 in the origin environment and Data Quality Check B selectable icon 540 in the target environment have each been identified as potential duplicates. The pair Computation Rule X selectable icon 335 and Computation Rule X selectable icon 535 are displayed with a first type of highlighting 575. The pair Data Quality Check B selectable icon 340 and Data Quality Check B selectable icon 540 are displayed with a distinct second type of highlighting 580.

Referring again to FIG. 4A, once the processor has thus displayed the selectable icons representing the potential duplicate objects with a highlight to indicate the potential duplicates, processing at process block 450 completes, and processing continues to END block 430, where processing completes. Alternatively, processing may continue to connector C 455, where method 460 begins.

Further, in one embodiment, the duplicate identification and highlighting functionality can be applied such that, when preparing to capture a snapshot and/or create an export dump or tagging of the state machine, any object that is already part of another tagged dump or exported state machine may be made visible with the highlighting in the display. This enables the user to select between exclusion or version update of the dependent object for a state machine that is to be tagged or exported.

Additionally, the duplicate identification and highlighting functionality can facilitate optimizations such as generating separate a separate archive dump for common lower order (grain) objects while higher order (grain) pipelines that describe process flow can be dumped in a separate snapshot with references to the lower order objects on which they depend.

FIG. 4B shows an embodiment of a computer implemented method associated with comparing objects in an origin environment with objects in a target environment, and in particular with identifying differences between potential duplicate objects.

The method 460 continues from method 440 at connector C 455. Method 440 may be initiated in response to various triggers, for example receiving a signal over a network or parsing stored data indicating that processing at process block 450 described with reference to FIG. 4A has completed. The method 460 proceeds from connector C 435 to process block 465.

At process block 465, the processor further compares a pair of object and second object identified as potential duplicate objects to determine differences between them. In one embodiment, the processor parses each of the object and the second object to identify all attributes. The processor then compares the attribute values of the object to the attribute values of the second object. If any of the attribute values differ between the object and the second object, the processor applies a label in metadata to the object and the second object that indicates that there are differences between them. In one embodiment, some attribute types may be excluded from the comparison, such as those attributes that will necessarily differ between the origin environment and the target environment (for example, location in memory or storage).

Once the processor has thus further compared the pair of the object and the second object, processing at process block 465 completes, and processing continues at process block 470.

At process block 470, the processor displays the selectable icons representing the potential duplicate objects with an additional indicator that shows that there are differences between the potential duplicate objects. In one embodiment, the processor parses the potential duplicate objects to identify each pair labeled in metadata as differing. The processor then retrieves an indicator (such as an icon) indicating differences in the pair from storage. The processor then generates a signal that causes the display to show the indicator associated with the selectable icons representing a pair of potential duplicates with a differences. In this way, the processor acts to call the user's attention to what may be important differences between potential duplicate objects.

In FIG. 5, one example of the indicator is shown by warning icon 585. Warning icon 585 is shown associated with each of the pair Data Quality Check B selectable icon 340 and Data Quality Check B selectable icon 540, due at least to the fact that second attribute 555 of object Data Quality Check B in the origin environment differs from second attribute 570 of object Data Quality Check B in the target environment.

This provides one example of an impact analysis of data change to dependent objects which are displayed in a visual representation. Here, the impact analysis is of dependencies and availability to a state machine in an origin environment (the behavioral run of FIG. 2) of an object in the target environment (the data quality check B belonging to the non-securitized run of FIG. 5). Here, the warning icon 585 indicates that the Data Quality Check B object in the target environment may have changed relative to the Data Quality Check B object in the origin environment. Due to the change, the dependency graph indicates that a shallow copy (only copying the target link for migration) is not preferred because incorrect data may be migrated. Thus, a deep copy operation should be selected and used to copy and dump the entire data (which would copy the modified data) for migration. These migration options (deep copy or shallow copy) are displayed and made available for selection for a selected object or pipeline as discussed in more detail with reference to process block 245 of FIG. 2.

Such impact analyses can further drive grouping, folderization, and/or segmenting of common objects under a separate maintenance group or entitlements. Impact analysis can lead to discovery of dependencies which may otherwise have been overlooked. This includes revealing higher order application objects that are affected by the data change. It is possible from a maintenance perspective to then assign such impacted objects to specific users, user-groups, or administrators to review. In one embodiment, impacted objects can be grouped into a folder or segment for easier identification and assignment to a group for review (also referred to as 'entitlements' for actions on these objects). In one embodiment, the system may automatically group the object into the folder or segment. In one embodiment, the system may further assign the folderized or segmented objects to a review group.

Referring again to FIG. 4B, once the processor has thus displayed the selectable icons with an additional indicator of differences between potential duplicate objects, processing at process block 470 completes, and processing continues to END block 430, where processing completes.

Summary View of Selected or Available Objects

FIG. 6 shows one embodiment of a graphical user interface 600 suitable for presentation on a display device and associated with showing a summary view of dependencies for objects that make up a state machine. This view provides an additional interface for configuring objects for export or import. Each of rows 605-635 is associated with an object, such as the object named in the object name column 640, that is in one embodiment available in an origin environment for export, or in another embodiment, is included in an archive dump file and available for import. The folder containing the location of each object on which another object depends is shown in the folder column 645. The include dependency column contains a check box 650 for each object on which another object depends to enable the user to select whether or not to include the object in the export or import. The include dependency column also includes a link icon 655 that, upon selection, cause the system to display further dependencies of the object. The additional parameters column includes link icons 660 that, upon selection, cause the system to display additional parameters of the object. The final row 665 includes interface elements that apply the functions described for the check box 650 and link icons 655 and 660 to all dependency objects listed in rows 610, 620-630 (and any dependency objects listed in un-expanded rows under aliases row 635). Note that, when the graphical user interface 600 is being used to show the objects selected from the origin environment for export, the interface header 670 may read "Selected Objects." Also, when the graphical user interface 600 is being used to show the included in an archive dump file for import, the interface header 670 may read "Available Objects."

Selected Migration Process Embodiments

In one embodiment, the process for migrating a state machine from an origin environment to a target environment may include the processor (i) automatically generating an archive dump file for the state machine; (ii) automatically applying a version and a time stamp to metadata of the archive dump file; and/or (iii) automatically importing the archive dump file to the target environment.

In one embodiment, the processor may maintain multiple versions of the state machine, for example in a metadata version maintenance system.

In one embodiment, the target environment may include a different version of the state machine. For example, the state machine in the origin environment may be a prior configuration of a state machine, and the target environment includes a later configuration of the state machine. Here, the migration of the state machine to the target environment causes at least a portion of the state machine in the target environment to revert to the prior configuration.

Figure 7:
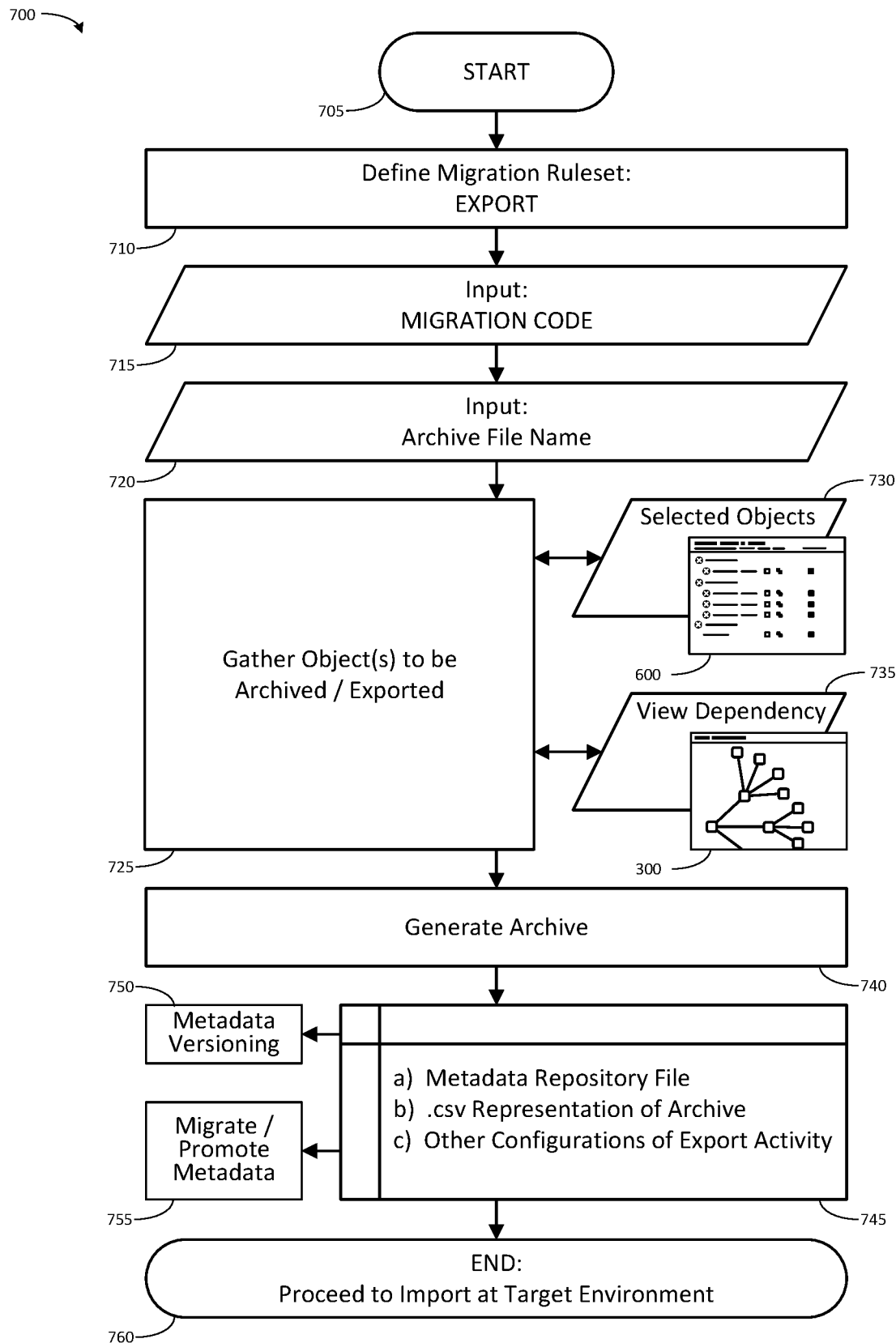
FIG. 7 illustrates one embodiment of a method associated with capturing a state-machine snapshot and export.

FIG. 7 shows one embodiment of a method 700 for capturing a state-machine snapshot and export. In one embodiment, the method 700 provides an example of a state machine snapshot generation process wherein (i) the dependency evaluation, and (ii) the deep/shallow copy evaluation of objects in the state machine environment are driven by a dependency graph interface. In this example, versioning is applied to the snapshot and the included objects automatically. Further, in this example, the export dump generation occurs automatically.

The method 700 may be initiated based on various triggers, such as receiving a signal over a network or parsing stored data indicating that (i) a user (or administrator) of an analytic system has initiated method 700, or (ii) that that method 700 is scheduled to be initiated at defined times or time intervals, for example to commence creation of a backup snapshot of one or more objects in the analytic system. In some embodiments, the method is initiated on a periodic schedule in accordance with trigger (ii) above. The method 700 initiates at start block 705 in response to parsing a signal received or stored data retrieved and determining that the signal or stored data indicates that the method 700 should begin. Processing continues to process block 710.

At process block 710, the processor defines the migration ruleset to be the ruleset used for export of state machines from the origin environment. Processing at process block 710 then completes, and processing continues to input/output (I/O) block 715.

At I/O block 715, the processor prompts the user to provide migration code for the export. In one embodiment, the user may direct the processor to retrieve an Oracle® EXP (export) tool from a location in storage. The processor will then use the code for the EXP tool as the migration code. Processing at I/O block 715 then completes, and processing continues to I/O block 720.

At I/O block 720, the processor prompts the user to provide an archive file name for the archive file that will be generated by the migration code. The processor receives the user's text input, evaluates it against any constraints for the archive file name, and if the user's text input is a satisfactory archive file name, the processor stores the text input for later retrieval and use when generating the archive file. Processing at I/O block 720 then completes, and processing continues to process block 725.

At process block 725, the processor gathers objects of the state machine to be archived or exported from the origin environment. The processor implements a selected objects graphical user interface (GUI) 730, for example, a GUI similar to GUI 600 described with reference to FIG. 6. The processor also implements a view dependency GUI 735, for example a GUI similar to GUI 300 described with reference to FIGS. 2 and 3. Through GUIs 730 and 735, the processor (i) displays information to the user about the objects and higher order entities present in the origin environment, and (ii) receives information from the user that selects and configures the objects to be included in the archive file, as described elsewhere herein. Once the user has completed his or her selection and configuration of the objects, the user may indicate this completion by input to the processor. Processing at process block 725 then completes, and processing continues to process block 740.

At process block 740, the processor generates the archive dump file. The processor retrieves the migration code and archive file name from storage. The processor executes the migration code on the selected and configured objects and the archive file name. The execution of the migration code results in the generation of an archive dump file named with the archive file name. Processing at process block 740 then completes, and processing continues to storage block 745.

At storage block 745, the processor stores the archive as a data structure in storage. The archive may be stored as a binary metadata repository file (for example, an Oracle® .dmp file), a comma-separated value representation of the archive (a .csv file), or some other configuration of the export activity.

In one embodiment, following the storage of the archive, processing proceeds to process block 750 where the processor launches and performs a metadata versioning process. In one embodiment, the processor determines a version for each object in the system, and applies it to the object. In one embodiment, the processor stores the version in the metadata of the object, for example as the version identifier value for the object described above. In one embodiment, the metadata versioning process includes the auto-versioning function described above.

In one embodiment, following the storage of the archive, processing proceeds to process block 755 where the processor launches and performs a metadata migration and/or promotion process. In one embodiment, migration or promotion of metadata is the act of moving the object from one environment to another. Here, the environment where the objects are selected is the 'source' and the environment or installation to which the objects are moved to is the 'target.' The migration of an object (metadata) may move dependent objects as well based on whether the dependents underwent changes.

Note that, in this example, objects in the environment may be referred to as metadata in reference to versioning and migration and promotion functions because objects in an analytic system are business logic abstractions, and the terms 'object' and 'metadata' are can be used interchangeably to a certain extent. An 'object' refers to business logic abstraction at a certain level of granularity. Thus, an object is metadata about the application ecosystem and hence the confluence of the terms 'object' and 'metadata.'

Once the processor has thus stored the archive file, processing at storage block 745 completes, and processing continues to END block 760 where processing completes. The archived state machine is ready to be imported into a target environment.

Figure 8:
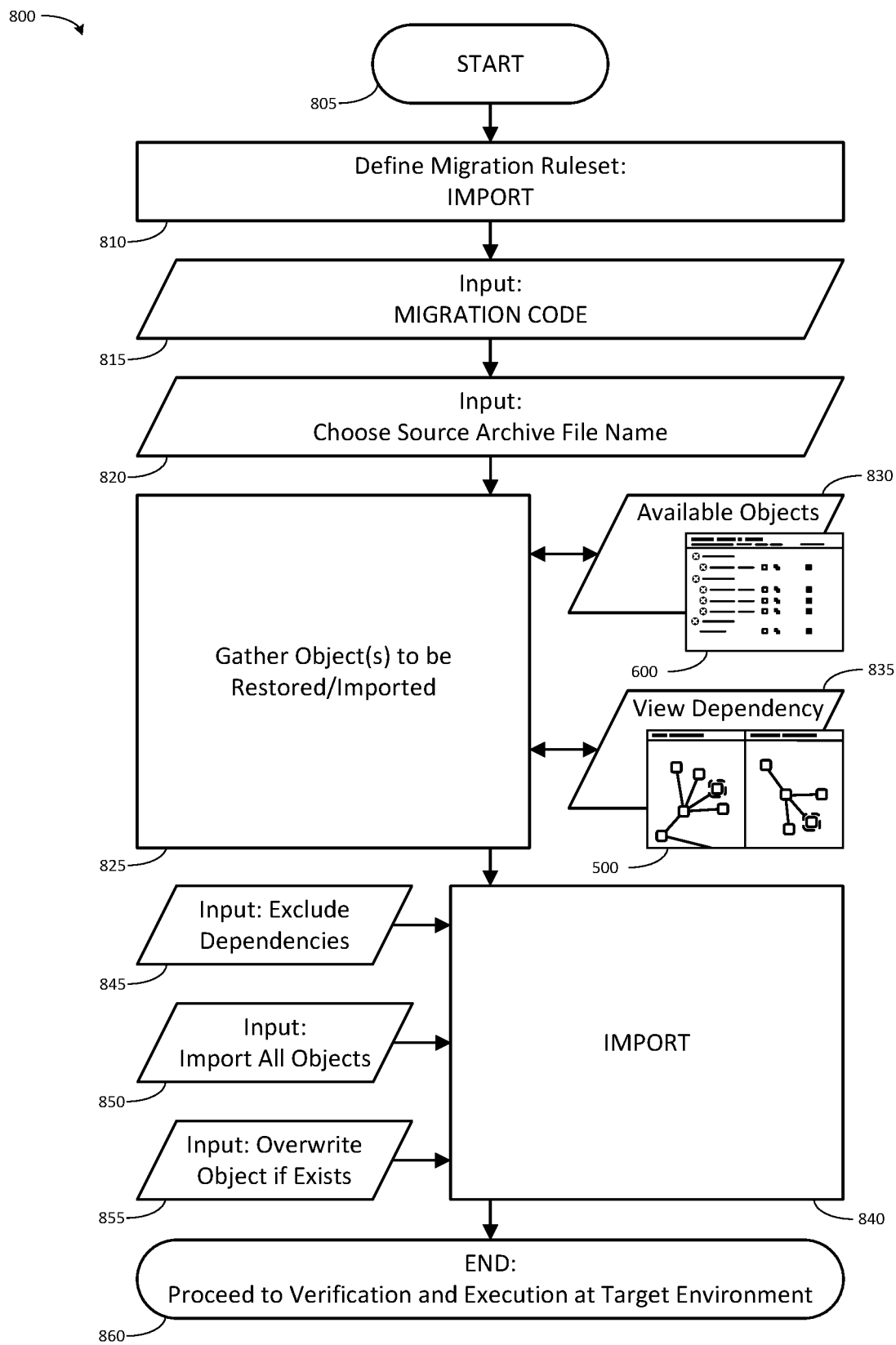
FIG. 8 illustrates one embodiment of a method associated with importing or restoring a state-machine to a target environment with verification through the dependency graph.

FIG. 8 shows one embodiment of a method 800 for importing or restoring a state-machine to a target environment with verification through the dependency graph.

The method 800 may be initiated based on various triggers, such as receiving a signal over a network or parsing stored data indicating that (i) a user (or administrator) of an analytic system has initiated method 800, or (ii) that that method 800 is scheduled to be initiated at defined times or time intervals, for example to commence an update to one or more objects in the analytic system. In some embodiments, the method is initiated on a periodic schedule in accordance with trigger (ii) above. The method 800 initiates at start block 805 in response to parsing a signal received or stored data retrieved and determining that the signal or stored data indicates that the method 800 should begin. Processing continues to process block 810.

At process block 810, the processor defines the migration ruleset to be the ruleset used for import of state machines into the target environment. Processing at process block 810 completes, and processing continues to input/output (I/O) block 815.

At I/O block 815, the processor prompts the user to provide migration code for the import. In one embodiment, the user may direct the processor to retrieve an Oracle® IMP (import) tool from a location in storage. The processor will then use the code for the IMP tool as the migration code. Processing at I/O block 815 completes, and processing continues to I/O block 820.

At I/O block 820, the processor prompts the user to provide an archive file name for the source archive file from which objects will be imported to a target environment. The processor accepts the user's input and retrieves the archive file from storage based on the input. Processing at I/O block 820 completes, and processing continues to process block 825.

At process block 825, the processor gathers objects from the archived state machine(s) in the archive file to be restored or imported into the target environment. The processor implements an available objects GUI 830, for example, a GUI similar to GUI 600 described with reference to FIG. 6. The processor also implements a view dependency GUI 835, for example a GUI similar to GUI 500 described with reference to FIGS. 4, 4A, 4B, and 5. Through GUIs 830 and 835, the processor (i) displays information to the user about the objects and higher order entities available in the archive file, and (ii) receives information from the user that selects and configures the objects to be imported from the archive file into the target environment, as described elsewhere herein. Once the user has completed his or her selection and configuration of the objects, the user may indicate this completion by input to the processor. Processing at process block 825 completes, and processing continues to process block 840.

At process block 840, the processor imports objects from the archive file to the target environment. The processor retrieves the migration code from storage. The processor executes the migration code on the selected and configured objects. The execution of the migration code results in transferring the selected and configured objects to the target environment.

During the course of the import, the processor may prompt the user to decide whether to exclude dependencies of one or more objects from importation into the target environment, as shown at I/O block 845. The processor may also prompt the user to decide whether to import all objects from the archive file into the target environment, as shown at I/O block 850. The processor may also prompt the user to decide whether or not to overwrite one or more objects that exist in the target environment with the version of the object from the archive file, as shown at I/O block 855.

Processing at process block 840 completes, and processing continues to END block 860, where processing completes. The state machine is now ready for verification and execution in the target environment Selected Additional Embodiments In one embodiment, a computer-implemented method performed by a computing device including at least one processor is implemented as described above. The method comprises: analyzing a target state-machine and determining dependencies between objects of the target state-machine; generating a dependency graph representing the dependencies between the objects and displaying the dependency graph on a display device, wherein the objects are generated as selectable objects; providing a migration option as a selection between either a deep copy or a shallow copy for a selected object or pipeline based at least on the dependencies of the selected object; and performing the migration option for the selected option. In one embodiment, the dependencies may be determined from metadata or other configuration data that is stored and defined for a target instance (the state-machine).

Further Benefits of the System and Method

In one or more embodiments, the present system and method allows for one or combinations of the following features: (1) rapid cloning of environments; maintaining multiple tagged states of a source environment; (2) capturing a state-machine and restoring with a visual audit, automatic dependency handling, auto-generated documentation, and in-place review/approval; (3) reversion back to prior configurations without expensive rework or manual effort for re-processing against an earlier time-period or against a different structure of processing entities—for example, the target environment may include a different version of the state machine; and (4) maintaining a set of valid state machines that are audited/approved—for example, these multiple versions of the state machines can be maintained, for example, in a metadata version maintenance system. Further, in a cloud computing environment, the present system and method provides for automation and maintenance of environments; and management of instances across multiple users, multiple tenants, and/or multiple business entities.

Special Purpose Computing Device Embodiment

Figure 9:
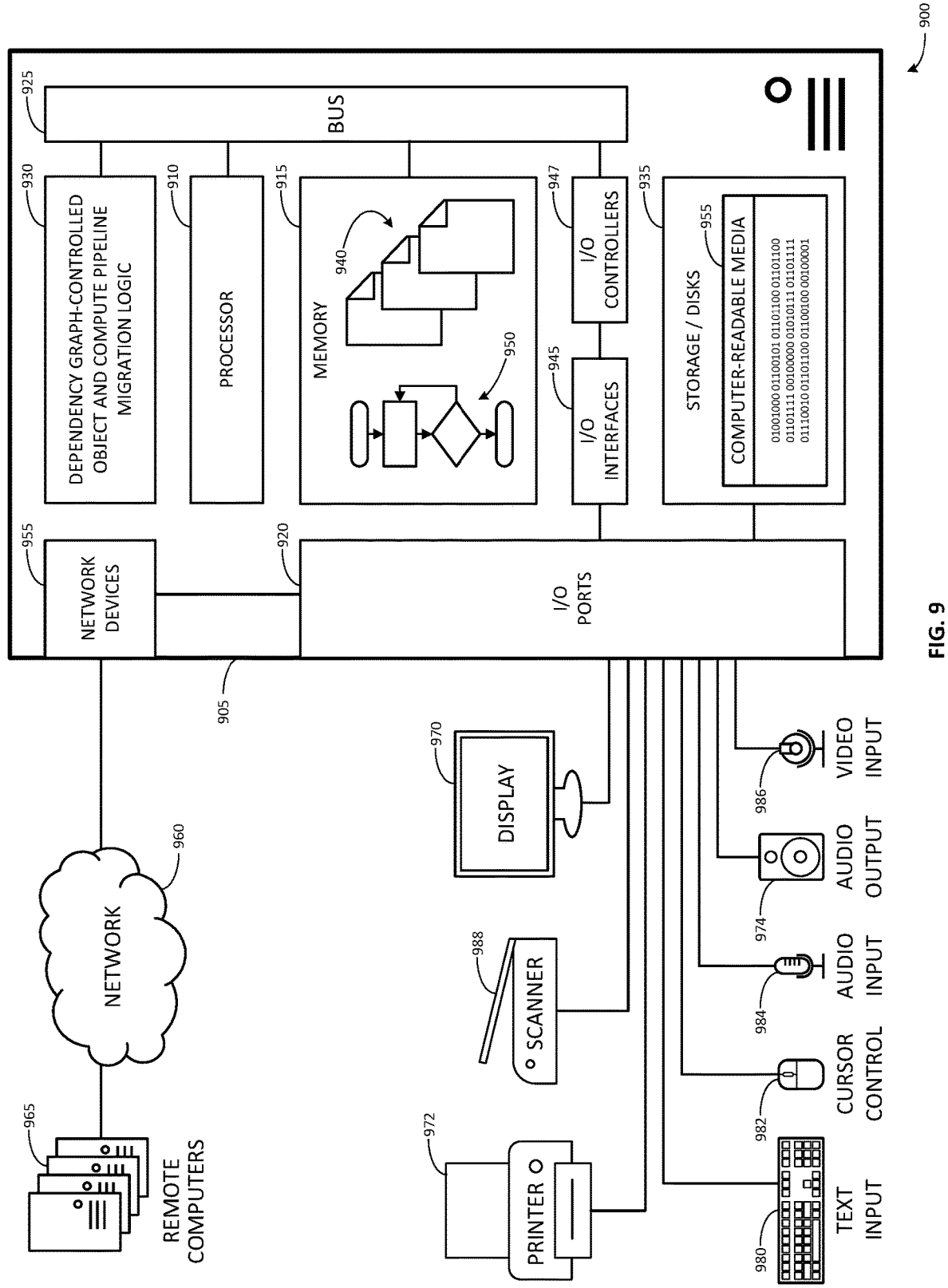
FIG. 9 illustrates an embodiment of a special purpose computing system configured with the example systems and/or methods disclosed.

FIG. 9 illustrates an example computing device that is configured and/or programmed with one or more of the example systems and methods described herein, and/or equivalents. The example computing device may be a computer 905 that includes a processor 910, a memory 915, and input/output ports 920 operably connected by a bus 925. In one example, the computer 905 may include a dependency graph-controlled object and compute pipeline migration logic 1030 configured to enable and facilitate migration of objects and compute pipelines using a dependency graph interface such as the logic and systems shown and described with reference to FIGS. 1-8 and 10-12C. In different examples, the logic 930 may be implemented in hardware, a non-transitory computer-readable medium with stored instructions, firmware, and/or combinations thereof. While the logic 930 is illustrated as a hardware component attached to the bus 925, it is to be appreciated that in other embodiments, the logic 930 could be implemented in the processor 910, stored in memory 915, or stored in disk 935, or implemented by the interoperation of these and other components.

In one embodiment, logic 930 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to automate process discovery and facilitation. The means may also be implemented as stored computer executable instructions that are presented to computer 905 as data 940 that are temporarily stored in memory 915 and then executed by processor 910.

Logic 930 may also provide means (e.g., hardware, non-transitory computer-readable medium that stores executable instructions, firmware) for performing automated process discovery and facilitation.

Generally describing an example configuration of the computer 905, the processor 910 may be a variety of various processors including dual microprocessor and other multi-processor architectures. A memory 915 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 935 may be operably connected to the computer 905 via, for example, an input/output (I/O) interface (e.g., card, device) 945 and an input/output port 1020. The disk 935 may be, for example, a magnetic disk drive, a solid-state disk drive, a floppy disk drive, a tape drive, a Zip drive, a flash memory card, a memory stick, and so on. Furthermore, the disk 935 may be a CD-ROM drive, a CD-R drive, a CD-RW drive, a DVD ROM, and so on. The memory 915 can store a process 950 and/or a data 940, for example. The disk 935 and/or the memory 915 can store an operating system that controls and allocates resources of the computer 905.

The computer 905 may interact with input/output (I/O) devices via the I/O interfaces 945 and the input/output ports 920. The communications between the processor 910 and the I/O interfaces 945 and ports 920 are managed by an input/output controller 947. The input/output ports 920 may include, for example, serial ports, parallel ports, and USB ports.

The computer 905 can operate in a network environment and thus may be connected to the network devices 955 via the I/O interfaces 945, and/or the I/O ports 920. Through the network devices 955, the computer 905 may interact with a network 960. Through the network 960, the computer 905 may be logically connected to remote computers 965. Networks with which the computer 905 may interact include, but are not limited to, a LAN, a WAN, and other networks.

The computer 905 can send and receive information and signals from one or more output devices or input devices through I/O ports 920. The output devices include one or more displays 970, printers 972 (such as inkjet, laser, or 3D printers), and audio output devices 974 (such as speakers or headphones). The input devices include one or more text input devices 980 (such as keyboards), cursor controllers 982 (such as mice, touchpads, or touch screens), audio input devices 984 (such as microphones), video input devices 986 (such as video and still cameras), or other input devices, such as scanner 988. Input/output devices may further include the disk 935, the network devices 955, and so on. In some cases, the computer 905 can be controlled by information or signals generated or provided by input or output devices, such as by text input devices 980, cursor controllers 982, audio input devices 984, disk 935, and network devices 955.

Cloud System, Multi-Tenant, and Enterprise Embodiments

In one embodiment, the present system is a computing/data processing system including an application or collection of distributed applications for enterprise organizations. The applications and computing system may be configured to operate with or be implemented as a cloud-based networking system, a software as a service (SaaS) architecture, or other type of networked computing solution. In one embodiment the present system is a centralized server-side application that provides at least the functions disclosed herein and that is accessed by many users via computing devices/terminals communicating with the computing system (functioning as the server) over a computer network.

FIG. 10 illustrates one embodiment of a multi-tenant system including migration of objects and compute pipelines using a dependency graph interface. Enterprise network 1005 may be associated with a business, such as a retailer, merchant, service provider, or other type of business. Alternatively, and in accordance with the advantages of an application service provider (ASP) hosted integrated financial analytics system (such as a multi-tenant data processing platform), the business may comprise fewer or no dedicated facilities or business network at all, provided that its end users have access to an internet browser and an internet connection. For simplicity and clarity of explanation, the enterprise network 1005 is represented by an on-site local area network 1010 to which one or more personal computers 1015, or servers 1020 are operably connected, along with one or more remote user computers 1025 that are connected to the enterprise network 1005 through the Internet 1030 or other suitable communications network or combination of networks. Each personal computer 1015 is generally dedicated to a particular end user, such as a service agent or other employee associated with the business, although such dedication is not required. The remote user computers 1025 may similarly be dedicated to a particular end user associated with the business. The personal computers 1015 and remote user computers 1025 can be, for example, a desktop computer, laptop computer, tablet computer, smartphone, or other device having the ability to connect to local area network 1010 or Internet 1030 or having other synchronization capabilities. Users of the enterprise network 1005 interface with integrated financial analytics system 1035 across the Internet 1030 or another suitable communications network or combination of networks.

Integrated financial analytics system 1035, which may be hosted by a dedicated third party, may include an integrated finance server 1040 and a web interface server 1045, operably connected by a network 1050. In some embodiments, either or both of the integrated finance server 1040 and the web interface server 1045 may be implemented on one or more different hardware systems and components, even though represented as single units in FIG. 10.

One example of an integrated financial analytics system 1035 is the Oracle® Financial Services Analytical Applications suite of products. Oracle® Financial Services Analytical Applications and other integrated financial analytics systems may be improved by incorporating the claimed systems and methods.

In one example configuration, integrated financial analytics system 1035 is operated by a third party for the benefit of multiple account owners/tenants, each of whom is operating a business, and each of whom has an associated enterprise network 1005.

In one example configuration, integrated finance server 1040 includes various modules, which may include, for example any one or more of a risk and performance management module 1055, a financial crime and compliance management module 1060, a data management and regulatory reporting module 1065, a modern finance module 1070, and one or more other modules 1075. Each of these modules may be made up of one or more sub-modules. Further, integrated finance server 1040 may further include user administration modules for governing the access of tenants and users to the integrated financial analytics system 1035.

In many cases, it will be desirable for the one of the above modules 1055-1075 to share methods, libraries, databases, subroutines, variables, etc., with one or more other of the above modules 1055-1075.

Web interface server 1045 is configured and adapted to interface with the integrated finance server 1040 to provide one or more web-based user interfaces to end users of the enterprise network 105. Metadata version maintenance systems 165A and 1656 are configured and adapted to interface with the integrated finance server 1040 and web interface server 1045 to accept exports of archive dump files from the integrated finance server 1040 and provide archive dump files for import to the integrated finance server 1040.

In one embodiment, a dependency graph-controlled object and compute migration server (or module) 1095 may be included in the integrated financial analytics system 1035. The dependency graph-controlled object and compute migration server (or module) 1095 is configured and adapted to interface with the integrated finance server 1040, web interface server 1045, and at least one of metadata version maintenance systems 165A and 165B. The dependency graph-controlled object and compute migration server (or module) 1095 may act to create exports from origin environments associated with integrated financial analytics system 1035 or create imports to target environments associated with integrated financial analytics system 1035, as described further herein.

The integrated financial analytics system 1035 shown in FIG. 10 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server may be a combination of hardware and the software that delivers content, commonly by hosting a website, to client web browsers that access the web server via the Internet. In one example, web interface server 1045 includes a web server.

Figure 11:
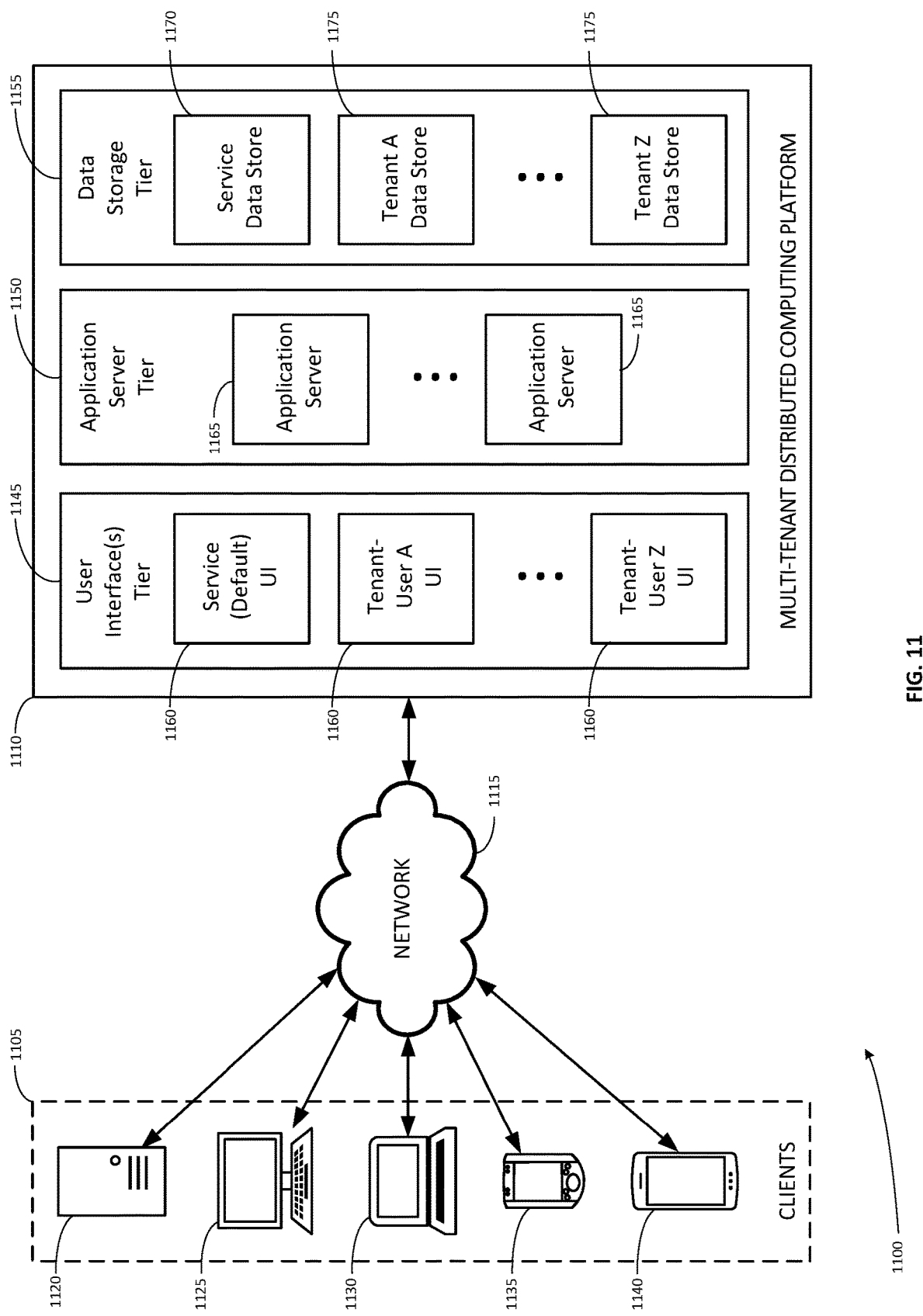
FIG. 11 illustrates elements or components of an example operating environment in which an embodiment of the invention may be implemented.

FIG. 11 is a diagram illustrating elements or components of an example operating environment 1100 in which an embodiment of the invention may be implemented. The software architecture depicted in FIG. 11 represents a simplified example of a complex software system to which an embodiment of the invention may be applied.

As shown, a variety of clients 1105 incorporating and/or incorporated into a variety of computing devices may communicate with a distributed computing service/platform 1110 through one or more networks 1115. For example, a client may incorporate and/or be incorporated into a client application implemented by one or more of the computing devices. Examples of suitable clients include web browsers and dedicated client software applications. Examples of suitable computing devices include server computers 1120, personal computers such as desktop computers 1125 and laptop or notebook computers 1130, tablet computers or personal digital assistants (PDAs) 1135, cell phones or smart phones 1140, and other electronic devices incorporating one or more computing device components, such as one or more electronic processors, microprocessors, central processing units (CPU), or controllers. Examples of suitable networks 1115 include networks utilizing wired and/or wireless communication technologies and networks operating in accordance with any suitable networking and/or communication protocol (e.g., the Internet).

In one embodiment, distributed computing service/platform 1110 may be a multi-tenant business data processing platform. In this configuration, service platform 1110 may be operated by an entity in order to provide multiple tenants with a set of business-related applications, data storage, and functionality. These applications and functionality may include ones that a business uses to manage various aspects of its operations. For example, the applications and functionality may include providing web-based access to business information systems, thereby allowing a user with a browser and an Internet or other network 1115 connection to view, enter, process, or modify certain types of business information.

The distributed computing service/platform 1110 may include multiple processing tiers, including a user interface tier 1145, an application server tier 1150, and a data storage tier 1155. Each processing tier shown in the figure may be implemented with a set of computers and/or computer components including a processor accessing memory, and may perform various functions, methods, processes, or operations as determined by the execution of a software application or set of instructions.

The user interface tier 1145 may maintain multiple user interfaces 1160, including graphical user interfaces and/or web-based interfaces. The user interfaces may include a default user interface for the service to provide access to applications and data for a user or "tenant" of the service (depicted as "Service (Default) UI" in the figure), as well as one or more user interfaces that have been specialized/customized in accordance with user specific requirements (represented by "Tenant-User A UI" . . . "Tenant-User Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc., although not all users will necessarily have permission to view these components.

The application server tier 1150 provides the framework of software to implement the functions or business applications of integrated finance server 140. Such functions or business applications are typically implemented by one or more modules of software code/instructions that are maintained on and executed by one or more application servers 1165 that are part of the platform's application server tier 1150.

The data storage tier 1155 may include one or more data stores, which may include a Service Data store 1170 and one or more Tenant Data stores 1175 (represented by "Tenant A Datastore" . . . "Tenant Z Datastore" in the figure). Each tenant data store 1175 may contain tenant-specific data that is used as part of providing a range of tenant-specific business services or functions, including but not limited to the to the functions or business applications of integrated finance server 140, such as ERP, CRM, etc. Data stores may be implemented with any suitable data storage technology, including structured query language (SQL) based relational database management systems (RDBMS).

FIG. 12A is a diagram illustrating additional details of the elements or components of the user interface 1160 first presented with reference to FIG. 11. Examples of user interfaces 1160 include graphical user interfaces (GUIs) and application programming interfaces (APIs). Each user interface 1160 may include one or more interface elements 1210 (represented by "User Interface Element 1" . . . "User Interface Element n" in the figure). For example, users may interact with interface elements in order to access functionality and/or data provided by application and/or data storage layers of the example architecture. Graphical user interfaces may be local or remote. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote. Examples of application programming interface elements include parameterized procedure calls, programmatic objects, and messaging protocols.

FIG. 12B is a diagram illustrating additional details of the elements or components of the application server 1165 first presented with reference to FIG. 11. Application server 1165 may include one or more application modules 1240 (represented by "Application Module 1" . . . "Application Module 1 m" in the figure), each of which may have one or more sub-modules 1245. Each application module 1240 or sub-module 1245 may correspond to a particular function, method, process, or operation that is implemented by the module or sub-module (e.g., a function or process related to providing ERP, CRM, eCommerce or another functionality to a user of the platform). Each application server 1165 may include each application module. Alternatively, different application servers 1165 may include different sets of application modules. Such sets may be disjoint or overlapping.

FIG. 12C is a diagram illustrating additional details of the elements or components of the data store 1170, 1175 first presented with reference to FIG. 11. Each data store 1170, 1175 may include one or more data objects 1270 each having one or more data object components 1275, such as attributes and/or behaviors. For example, the data store 1170, 1175 may correspond to a relational database, the data objects 1270 may correspond to tables of the relational database, and the data object components 1275 may correspond to columns or fields of such tables. Alternatively, or in addition, the data objects may correspond to data records having fields and associated services. Alternatively, or in addition, the data objects may correspond to persistent instances of programmatic data objects, such as structures and classes. Alternatively, or in addition, the data store 1170, 1175, data objects 1270, and data object components 1275 may each be any form of data structure as described herein. Each data store in the data storage layer may include each data object. Alternatively, different data stores may include different sets of data objects. Such sets may be disjoint or overlapping.

Software Module Embodiments

In general, software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions are typically arranged into program modules with each such module performing a specific task, process, function, or operation. The entire set of modules may be controlled or coordinated in their operation by an operating system (OS) or other form of organizational platform.

In one embodiment, one or more of the components, functions, methods, or processes described herein are configured as modules stored in a non-transitory computer readable medium. The modules are configured with stored software instructions that when executed by at least a processor accessing memory or storage cause the computing device to perform the corresponding function(s) as described herein.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

Further, where a series of blocks in a figure expresses a loop, an embodiment in a post-test or "do . . . while" loop could, in other embodiments, be implemented as a pre-test or "while" loop, and vice versa.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
USB: universal serial bus.
WAN: wide area network.

A "data structure", as used herein, is an organization of data in a computing system that is stored in a memory, a storage device, or other computerized system. A data structure may be any one of, for example, a data field, a data file, a data array, a data vector, a data record, a database, a data table, a data matrix, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer accessing memory of the computer cause the computer to:
   analyze a state machine to determine (i) objects of the state machine and (ii) dependencies between the objects of the state machine;
   generate a dependency graph representing the objects and the dependencies between the objects;
   display the dependency graph on a display device, wherein the objects are represented by selectable icons;
   in response to a selection of a particular selectable icon, provide a migration option for an object represented by the selectable icon, wherein the migration option includes at least a selection between either (a) a deep copy of the object represented by the selectable icon including copying attributes, referenced dependent objects, and target data of the object or (b) a shallow copy for the object represented by the selectable icon including only links to target data and links to attributes of the object;
   store a selection of the migration option for the object represented by the particular selectable icon; and
   control the migration of the state machine to a target environment based at least in part on performing the migration option for the object represented by the particular selectable icon.

2. The non-transitory computer-readable medium of claim 1, wherein the instructions further cause the computer to:
   analyze a second state machine existing in the target environment to determine (i) second objects of the second state machine and (ii) second dependencies between the second objects of the second state machine;
   generate a second dependency graph representing the second objects and the second dependencies between the second objects;
   display the second dependency graph on the display device in addition to the dependency graph, wherein the second objects are represented by selectable icons; and
   in response to a selection of the particular selectable icon, display additional attributes of the object or second object represented by the particular selectable icon.

3. The non-transitory computer-readable medium of claim 2, wherein the instructions further cause the computer to:
   compare the objects of the state machine to the second objects of the second state machine to identify potential duplicates in the target environment of the objects of the state machine migrating to the target environment; and
   display the selectable icons representing the potential duplicate objects with a highlight to indicate the potential duplicates.

4. The non-transitory computer-readable medium of claim 3, wherein the instructions further cause the computer to:
   further compare a pair of object and second object identified as potential duplicate objects to determine differences between them; and
   display the selectable icons representing the potential duplicate objects with an additional indicator that shows that there are differences between the potential duplicate objects.

5. The non-transitory computer-readable medium of claim 3, wherein each object has a common set of attributes, and wherein the comparison of the objects of the state machine to the second objects of the second target state machine includes a comparison of values of one or more of the common attributes between the objects and the second objects.

6. The non-transitory computer-readable medium of claim 1, wherein the instructions further cause the computer to generate the dependency graph as a directed acyclic graph.

7. The non-transitory computer-readable medium of claim 1, wherein the instructions further cause the computer to migrate the state machine to the target environment by:

generating an archive dump file for the state machine;
automatically applying a version and a time stamp to metadata of the archive dump file; and
importing the archive dump file to the target environment.

8. The non-transitory computer-readable medium of claim 1, wherein the instructions further cause the computer to maintain multiple versions of the state machine in a metadata version maintenance system.

9. The non-transitory computer-readable medium of claim 1, wherein the target environment includes a different version of the state machine.

10. The non-transitory computer-readable medium of claim 1, wherein the state machine is a prior configuration of a state machine, and the target environment includes a later configuration of the state machine, and the migration of the state machine to the target environment causes at least a portion of the state machine to revert to the prior configuration.

11. A computer-implemented method, comprising:
analyzing a state machine to determine (i) objects of the state machine and (ii) dependencies between the objects of the state machine;
generating a dependency graph that represents the objects and the dependencies between the objects;
displaying the dependency graph on a display device, wherein the objects are represented by selectable icons;
in response to a selection of a particular selectable icon, providing a migration option for an object represented by the selectable icon, wherein the migration option includes at least a selection between either (a) a deep copy of the object represented by the selectable icon including copying attributes, referenced dependent objects, and target data of the object or (b) a shallow copy for the object represented by the selectable icon including only links to target data and links to attributes of the object;
storing a selection of the migration option for the object represented by the particular selectable icon; and
migrating the state machine to a target environment based at least in part on performing the migration option for the object represented by the particular selectable icon.

12. The computer-implemented method of claim 11, further comprising:
analyzing a second state machine that exists in the target environment to determine (i) second objects of the second state machine and (ii) second dependencies between the second objects of the second state machine;
generating a second dependency graph that represents the second objects and the second dependencies between the second objects;
displaying the second dependency graph on the display device in addition to the dependency graph, wherein the second objects are represented by selectable icons; and
in response to a selection of the particular selectable icon, displaying additional attributes of the object or second object represented by the particular selectable icon.

13. The computer-implemented method of claim 12, further comprising:
comparing the objects of the state machine to the second objects of the second state machine to identify potential duplicates in the target environment of the objects of the state machine migrating to the target environment;
further comparing a pair of object and second object identified as potential duplicate objects to determine differences between them; and
display the selectable icons representing the potential duplicate objects with an indicator that shows that there are differences between the potential duplicate objects.

14. The computer-implemented method of claim 11, wherein the dependency graph is generated as a directed acyclic graph.

15. The computer-implemented method of claim 11, wherein the state machine is migrated to the target environment by:
generating an archive dump file for the state machine;
automatically applying a version and a time stamp to metadata of the archive dump file; and
importing the archive dump file to the target environment.

16. The computer-implemented method of claim 11, wherein the state machine is a prior configuration of a state machine, and the target environment includes a later configuration of the state machine, and the migration of the state machine to the target environment causes at least a portion of the state machine to revert to the prior configuration.

17. A system for migrating a state machine to a target environment, comprising:
a processor;
a memory operably connected to the processor;
a non-transitory computer-readable medium operably connected to the processor and memory and storing computer-executable instructions that when executed by least the processor accessing the memory cause the system to:
analyze a state machine to determine (i) objects of the state machine and (ii) dependencies between the objects of the state machine;
generate a dependency graph representing the objects and the dependencies between the objects;
display the dependency graph on a display device, wherein the objects are represented by selectable icons;
in response to a selection of a particular selectable icon, provide a migration option for an object represented by the selectable icon, wherein the migration option includes at least a selection between either (a) a deep copy of the object represented by the selectable icon including copying attributes, referenced dependent objects, and target data of the object or (b) a shallow copy for the object represented by the selectable icon including only links to target data and links to attributes of the object;
store a selection of the migration option for the object represented by the particular selectable icon; and
control the migration of the state machine to a target environment based at least in part on performing the migration option for the object represented by the particular selectable icon.

18. The system of claim 17 wherein the instructions further cause the system to:
analyze a second state machine existing in the target environment to determine (i) second objects of the second state machine and (ii) second dependencies between the second objects of the second state machine;
generate a second dependency graph representing the second objects and the second dependencies between the second objects;
display the second dependency graph on the display device in addition to the dependency graph, wherein the second objects are represented by selectable icons; and in response to a selection of the particular selectable icon, display additional attributes of the object or second object represented by the particular selectable icon.

19. The system of claim 17 wherein the instructions further cause the system to migrate the state machine to the target environment by:
generating an archive dump file for the state machine based at least in part on the stored selection of the migration option;
automatically applying a version and a time stamp to metadata of the archive dump file; and
importing the archive dump file for the state machine to the target environment.

20. The system of claim 17 further comprising:
an operable connection from the processor and memory to an origin environment that hosts the state machine; and
an operable connection from the processor and memory to the target environment, wherein the target environment is a cloud computing system.

\* \* \* \* \*